US008215888B2

(12) United States Patent
Tetley et al.

(10) Patent No.: US 8,215,888 B2
(45) Date of Patent: Jul. 10, 2012

(54) CARTRIDGE TUBULAR HANDLING SYSTEM

(75) Inventors: Paul Stephen Tetley, Katy, TX (US); Daniel B. Holsberg, Cypress, TX (US); Calvin Vinal Norton, Houston, TX (US)

(73) Assignee: Friede Goldman United, Ltd., Houston, TX (US)

( * ) Notice: Subject to any disclaimer, the term of this patent is extended or adjusted under 35 U.S.C. 154(b) by 379 days.

(21) Appl. No.: 12/589,062

(22) Filed: Oct. 16, 2009

(65) Prior Publication Data

US 2011/0091304 A1 Apr. 21, 2011

(51) Int. Cl.

| | |
|---|---|
| ***E21B 7/04*** | (2006.01) |
| ***E21B 19/20*** | (2006.01) |
| ***E21B 19/00*** | (2006.01) |
| ***E21B 19/14*** | (2006.01) |
| ***B65G 1/08*** | (2006.01) |

(52) U.S. Cl. ................ 414/22.62; 414/933; 414/416.08; 414/746.8

(58) Field of Classification Search ............... 198/468.6; 211/151, 59.3, 70.4; 414/22.51–22.55, 22.62, 414/404, 413–415, 416.04, 416.08, 416.09, 414/419, 421, 422, 425, 742, 745.1, 745.6, 414/745.7, 745.8, 745.9, 746.2, 746.4, 746.5, 414/746.6, 746.8, 795.8, 795.9, 796.2, 796.7, 414/798, 933; 53/148, 245, 246, 537
See application file for complete search history.

(56) References Cited

U.S. PATENT DOCUMENTS 1,253,997 A * 1/1918 Whitehurst et al. ............ 53/152
1,776,605 A 9/1930 Tibbetts
1,829,879 A 11/1931 Stephens
2,354,217 A 7/1944 Mullinix et al.
2,381,166 A 8/1945 Hollerith
2,503,516 A 4/1950 Shrewsbury
2,773,605 A 12/1956 Jarnett
2,808,229 A 10/1957 Bauer et al.
3,001,594 A 9/1961 Suderow
3,038,432 A 6/1962 Goldman
3,191,201 A 6/1965 Richardson et al.
3,279,404 A 10/1966 Richardson et al.
3,365,085 A * 1/1968 Wilson .......................... 414/471
3,404,741 A 10/1968 Gheorghe et al.
3,412,981 A 11/1968 Richardson et al.
(Continued)

FOREIGN PATENT DOCUMENTS

DE 1917451 11/1969
(Continued)

OTHER PUBLICATIONS

National Oilwell Varco website, Nov. 20, 2006 (Horizontal/Vertical Pipehandling, Stand Hand II, V-Door Machine, Pipe Laydown System) © 2006 National Oilwell Varco (10 pages).

(Continued)

*Primary Examiner* — Gregory Adams
(74) *Attorney, Agent, or Firm* — Strasburger & Price, LLP

(57) ABSTRACT

A cartridge of tubulars may be removably positioned with a carriage, and the carriage may move the cartridge transversely, vertically, and/or rotationally to roll tubulars on an adjacent tubular receiving member using only gravity from a selected tier of tubulars without human contact. A single trolley disposed with the tubular receiving member both pushes and pulls tubulars toward or away from the drilling deck.

19 Claims, 15 Drawing Sheets

U.S. PATENT DOCUMENTS 3,461,828 A 8/1969 Bielstein
3,477,235 A 11/1969 Branham et al.
3,494,484 A 2/1970 McFadden
3,501,017 A 3/1970 Johnson et al.
3,552,343 A 1/1971 Scott
3,561,811 A 2/1971 Turner, Jr.
3,601,075 A 8/1971 Deslierres
3,602,302 A 8/1971 Kluth
3,615,027 A 10/1971 Ham
3,628,336 A 12/1971 Moore et al.
3,633,771 A 1/1972 Woolslayer et al.
3,682,242 A 8/1972 Brooks et al.
3,734,210 A 5/1973 Wilderman
3,739,736 A 6/1973 Carreau et al.
3,768,663 A 10/1973 Turner et al.
3,774,562 A 11/1973 Dean, III
3,780,883 A 12/1973 Brown
3,799,364 A 3/1974 Kelly et al.
3,802,209 A 4/1974 Weaver
3,822,663 A 7/1974 Boschen, Jr.
3,828,561 A 8/1974 Moore et al.
3,880,105 A 4/1975 Bryant
3,931,782 A 1/1976 Childers et al.
3,937,515 A 2/1976 Langowski
3,976,207 A 8/1976 Schultz
3,986,619 A 10/1976 Woolslayer
3,987,910 A 10/1976 Brunato
4,013,178 A 3/1977 Brown et al.
RE29,373 E 8/1977 Boschen, Jr.
4,042,123 A 8/1977 Sheldon et al.
4,067,453 A 1/1978 Moller
4,099,630 A 7/1978 Beck
4,108,255 A 8/1978 Smith
4,126,348 A 11/1978 Palmer
4,139,891 A 2/1979 Sheldon et al.
4,189,255 A 2/1980 Macan et al.
4,195,950 A 4/1980 Goldman
4,208,158 A 6/1980 Davies et al.
4,227,831 A 10/1980 Evans
4,235,566 A 11/1980 Beeman et al.
4,269,543 A 5/1981 Goldman et al.
4,269,554 A 5/1981 Jackson
4,274,778 A 6/1981 Putnam et al.
4,305,686 A 12/1981 Magill
4,334,584 A 6/1982 Magill
4,345,864 A 8/1982 Smith, Jr. et al.
4,351,258 A 9/1982 Ray et al.
4,397,605 A 8/1983 Cowgill et al.
4,403,897 A 9/1983 Willis
4,403,898 A 9/1983 Thompson
4,426,182 A 1/1984 Frias et al.
4,446,807 A 5/1984 Johnson
4,457,250 A 7/1984 Oshima et al.
4,458,768 A 7/1984 Boyadjieff
4,462,733 A 7/1984 Langowski et al.
4,470,468 A 9/1984 Phares
4,470,740 A 9/1984 Frias
4,483,644 A 11/1984 Johnson
4,486,137 A 12/1984 Buckner
4,509,448 A 4/1985 Pease
4,519,728 A 5/1985 Oshima et al.
4,533,055 A 8/1985 Haney
4,571,125 A 2/1986 Oshima et al.
4,601,252 A 7/1986 Wuttudal
4,602,894 A 7/1986 Lorenz
4,604,961 A 8/1986 Ortloff et al.
4,605,077 A 8/1986 Boyadjieff
4,610,315 A 9/1986 Koga et al.
4,621,974 A 11/1986 Krueger
4,629,014 A 12/1986 Swisher et al.
4,658,903 A 4/1987 Tateishi
4,692,081 A 9/1987 Bennett et al.
4,709,766 A 12/1987 Boyadjieff
RE32,589 E 2/1988 Goldman et al.
4,725,179 A 2/1988 Woolslayer et al.
4,738,321 A 4/1988 Olivier
4,744,710 A 5/1988 Reed
4,762,185 A 8/1988 Simpson
4,765,401 A 8/1988 Boyadjieff
4,791,997 A 12/1988 Krasnov
4,819,730 A 4/1989 Williford et al.
4,822,230 A 4/1989 Slettedal
4,834,604 A 5/1989 Brittain et al.
4,850,439 A 7/1989 Lund
4,862,973 A 9/1989 Voigts et al.
4,901,805 A 2/1990 Ali-Zade et al.
5,052,860 A 10/1991 Ingle
5,092,712 A 3/1992 Goldman et al.
5,107,940 A 4/1992 Berry
5,181,798 A 1/1993 Gilchrist, Jr.
5,183,122 A 2/1993 Rowbotham et al.
5,226,773 A * 7/1993 Morito et al. .............. 414/137.1
5,248,003 A 9/1993 Song et al.
5,381,750 A 1/1995 Pollack
5,458,454 A 10/1995 Sorokan
5,622,452 A 4/1997 Goldman
5,647,443 A 7/1997 Broeder
5,921,714 A 7/1999 Goldman
5,934,216 A 8/1999 Childers et al.
6,047,781 A 4/2000 Scott et al.
6,048,135 A 4/2000 Williford et al.
6,056,071 A 5/2000 Scott et al.
6,068,069 A 5/2000 Scott et al.
6,085,851 A 7/2000 Scott et al.
6,089,333 A 7/2000 Rise
6,171,027 B1 1/2001 Blankestijin
6,203,248 B1 3/2001 Childers et al.
6,220,807 B1 4/2001 Sorokan
6,231,269 B1 5/2001 Shear et al.
6,298,927 B1 10/2001 Black
6,311,788 B1 11/2001 Weixler
6,343,662 B2 2/2002 Byrt et al.
6,378,450 B1 4/2002 Begnaud et al.
6,481,931 B1 11/2002 Welsh
6,484,806 B2 11/2002 Childers et al.
6,491,174 B1 12/2002 Day
6,513,605 B1 2/2003 Lodden
6,527,493 B1 3/2003 Kamphorst et al.
6,533,519 B1 3/2003 Tolmon et al.
6,550,128 B1 4/2003 Lorenz
6,591,904 B2 7/2003 Cicognani et al.
6,609,573 B1 8/2003 Day
6,634,443 B1 10/2003 Paech et al.
6,688,398 B2 2/2004 Pietras
6,695,559 B1 2/2004 Pietras
6,701,861 B2 3/2004 Key et al.
6,705,414 B2 3/2004 Simpson et al.
6,766,860 B2 7/2004 Archibald et al.
6,779,614 B2 8/2004 Oser
6,821,071 B2 11/2004 Woolslayer et al.
6,854,520 B1 2/2005 Robichaux
6,857,483 B1 2/2005 Dirks et al.
6,860,694 B2 3/2005 Slettedal
6,926,488 B1 8/2005 Bolding et al.
6,932,553 B1 8/2005 Roodenburg et al.
6,969,223 B2 11/2005 Tolmon et al.
6,976,540 B2 12/2005 Berry
6,994,505 B2 2/2006 Hawkins, III
6,997,265 B2 2/2006 Berry
7,004,259 B2 2/2006 Pietras
7,021,374 B2 4/2006 Pietras
7,055,594 B1 6/2006 Springett et al.
7,083,007 B2 8/2006 Herst
7,090,035 B2 8/2006 Lesko
7,096,977 B2 8/2006 Juhasz et al.
7,128,161 B2 10/2006 Pietras
7,137,454 B2 11/2006 Pietras
7,140,443 B2 11/2006 Beierbach et al.
7,228,913 B2 6/2007 Folk et al.
7,228,919 B2 6/2007 Fehres et al.
7,246,983 B2 7/2007 Zahn et al.
7,320,374 B2 1/2008 Folk et al.
7,331,746 B2 2/2008 Wright et al.
7,347,285 B2 3/2008 Hamner
7,350,587 B2 4/2008 Springett et al.
7,404,697 B2 7/2008 Thompson
7,537,424 B2 5/2009 Innes et al.

| | | | |
|---|---|---|---|
| 7,540,338 | B2 | 6/2009 | Belik |
| 7,600,584 | B2 | 10/2009 | Sewell et al. |
| 2003/0049077 | A1 | 3/2003 | Geiger, Jr. et al. |
| 2003/0159853 | A1 | 8/2003 | Archibald et al. |
| 2003/0159854 | A1 | 8/2003 | Simpson et al. |
| 2003/0196791 | A1 | 10/2003 | Dunn et al. |
| 2004/0045703 | A1 | 3/2004 | Hooper |
| 2004/0136813 | A1 | 7/2004 | Pietras |
| 2005/0051343 | A1 | 3/2005 | Pietras et al. |
| 2005/0238463 | A1 | 10/2005 | Smith |
| 2005/0269133 | A1 | 12/2005 | Little |
| 2006/0151215 | A1 | 7/2006 | Skogerbo |
| 2007/0017704 | A1 | 1/2007 | Belik |
| 2007/0031215 | A1 | 2/2007 | Belik |
| 2007/0193750 | A1 | 8/2007 | Wright et al. |
| 2008/0101891 | A1 | 5/2008 | Belik |
| 2008/0128167 | A1 | 6/2008 | Eriksen |
| 2008/0136203 | A1 | 6/2008 | Krijnen et al. |
| 2008/0164064 | A1 | 7/2008 | Belik et al. |
| 2008/0202812 | A1 | 8/2008 | Childers et al. |

FOREIGN PATENT DOCUMENTS

| | | | | |
|---|---|---|---|---|
| DE | 2345167 | | | 4/1974 |
| DE | 2721342 | A | * | 11/1978 |
| EP | 0139237 | A1 | | 5/1985 |
| EP | 0234880 | A2 | | 9/1987 |
| EP | 0258705 | A2 | | 3/1988 |
| EP | 0406986 | A2 | | 1/1991 |
| FR | 1379830 | | | 10/1963 |
| FR | 2381166 | | | 9/1978 |
| FR | 2670742 | A1 | | 6/1992 |
| GB | 1214346 | | | 12/1970 |
| GB | 1494720 | | | 12/1977 |
| GB | 1540544 | | | 2/1979 |
| GB | 2066758 | A | | 7/1981 |
| GB | 2071734 | A | | 9/1981 |
| GB | 2094376 | A | | 9/1982 |
| GB | 2119427 | A | | 11/1983 |
| GB | 2125862 | A | | 3/1984 |
| GB | 2137261 | A | | 10/1984 |
| GB | 2158132 | A | | 11/1985 |
| GB | 2160166 | A | | 12/1985 |
| GB | 2160564 | A | | 12/1985 |
| GB | 2175629 | A | | 12/1986 |
| GB | 2264734 | A | | 9/1993 |
| GB | 2264736 | A | | 9/1993 |
| GB | 2291664 | A | | 1/1996 |
| GB | 2386853 | A | | 10/2003 |
| GB | 2386856 | A | | 10/2003 |
| JP | 60-146787 | A | | 8/1985 |
| JP | 62-80196 | A | | 4/1987 |
| JP | 08189278 | A | * | 7/1996 |
| NL | 8802980 | A | | 12/1988 |
| WO | WO82/01212 | | | 4/1982 |
| WO | WO83/01810 | | | 5/1983 |
| WO | WO83/03118 | | | 9/1983 |
| WO | WO87/07674 | A1 | | 12/1987 |
| WO | WO88/01008 | A1 | | 2/1988 |
| WO | WO88/08806 | A1 | | 11/1988 |
| WO | WO93/09330 | A1 | | 5/1993 |
| WO | WO93/15303 | A1 | | 8/1993 |
| WO | WO2008/012580 | A1 | | 1/2008 |

OTHER PUBLICATIONS

Aker Kvaerner MH website, Nov. 21, 2006 (Eagle/Eagle Light, Gantry Crane, Pipedeck Pipehandler, Riser Handling Crane, Piperack Crane, Catwalk/Tubular Feeding machine, Bridge Crane Systems, Fingerboards, 2-Arm System), © 2006 Aker Kvaerner MH numbered pp. 34-38 (5 pages).

Smedvig Asia Ltd. of Singapore "CD" (West Alliance 2002 Pipe Handling), referenced in above US-2008/0202812 A1 specification (one CD provided).

PCT International Searching Authority, International Search Report and Written Opinion, Sep. 23, 2008 for corresponding PCT application claiming priority to above US-2008/0202812 A1 (7 pages).

OHS Group Limited website, printed on Oct. 16, 2008 (Lightweight Pipehandling System), © 2008 OHS Group Limited (1 page).

OHS Group Limited website, printed on Oct. 15, 2008 (enlarged left drawing of Cite No. E above showing Lightweight Pipehandling System for use with Jack-up and Land Drilling Rigs), © 2008 OHS Group Limited and indicates Pat. Nos. WO2008/012580 A1 and GB08175747 (1 page).

OHS Group Limited website, printed on Oct. 16, 2008 (enlarged right drawing of Cite No. E above showing Lightweight Pipehandling System for use with Semisubmersibles and Drill ships), © 2008 OHS Group Limited and indicates Pat. Nos. WO2008/012580 A1 and GB08175747 (1 page).

OHS Group Limited website, printed on Oct. 27, 2008 (Derricks, Bridge Crane Racking System, Racking Boards, Monkey Board (Diving Board), HTV (Horizontal to Vertical) Arm, Catwalk Machine, Standbuild Systems, Dual Activity System—Jack-up (DA), Pipehandling Crane, Trojan Pipehandler, DFMA DrillFloor Manipulator Arm, CSB Telescopic Casing Stacking Basket, CTU Conductor Tensioning Unit, Subsea Handling Systems, BOP Handling on Drillships and Semisubmersibles, Riser Management—Horizontal, and Riser Management—Vertical), © 2008 OHS Group Limited (11 pages).

OHS Group Limited website, printed on Oct. 27, 2008 (Reference List with Year, Client/Rig, and Project), © 2008 OHS Group Limited (see 2007 Friede Goldman Atwood Aurora listings) (3 pages).

OHS Group Limited website, printed on Oct. 27, 2008 (Serving the Oilfield and Product Support), © 2008 OHS Group Limited (1 page).

OHS Group Limited website, printed on Oct. 27, 2008 (Home Page), © 2008 OHS Group Limited (1 page).

OHS Group Limited website, printed on Oct. 27, 2008 (OHS Group of Companies), © 2008 OHS Group Limited (2 pages).

Baker, Ron, A Primer of Offshore Operations, 3rd Edition, 1998 © page and p. 55, © 1998 The University of Texas at Austin (2 pages).

PETEX, The University of Texas at Austin Petroleum Extension Service, The Rotary Rig and Its Components, © 1979 The University of Texas at Austin (1 page).

UK Intellectual Property Office website, Patents Status Information, Application No. GB0602013.5 titled "Equipment Handling System," filed Feb. 1, 2006 by Brendan Larkin, terminated Feb. 2, 2007, © 2008 Crown (1 page).

UK Intellectual Property Office website, Patents Status Information, Application No. GB0614744.1 titled "Racking Module," filed Jul. 25, 2006 by OHS Group Limited, terminated Oct. 26, 2007, © 2008 Crown (1 page) (priority claimed to this Application in PCT WO 2008/012580 A1 above).

UK Intellectual Property Office website, Patents Status Information, Application No. GB0801293.2 titled "Equipment Handling System," filed Jan. 24, 2008 by OHS Group Limited, © 2008 Crown (1 page).

UK Intellectual Property Office website, Patents Status Information, Application No. GB0801295.7 titled "Compensating Cellar Deck," filed Jan. 24, 2008 by OHS Group Limited, © 2008 Crown (1 page).

UK Intellectual Property Office Searchable Patents Journal Result list for GB08175747 (not yet available) (2 pages), published Oct. 16, 2008.

Family list, 12 family members derived from EP0258705 (1 page), published Oct. 16, 2008.

Family list, 10 family members derived from GB1214346 (1 page), published Oct. 16, 2008.

UK Intellectual Property Office Searchable Patents Journal Result list for GB0817574.7 stating published on Nov. 5, 2008 (one page); Electronic Filing Receipt for GB0817574.7 stating filing date of Sep. 25, 2008 (2 pages) and application from Brendan Larkin (19 pages) (22 pages total).

* cited by examiner

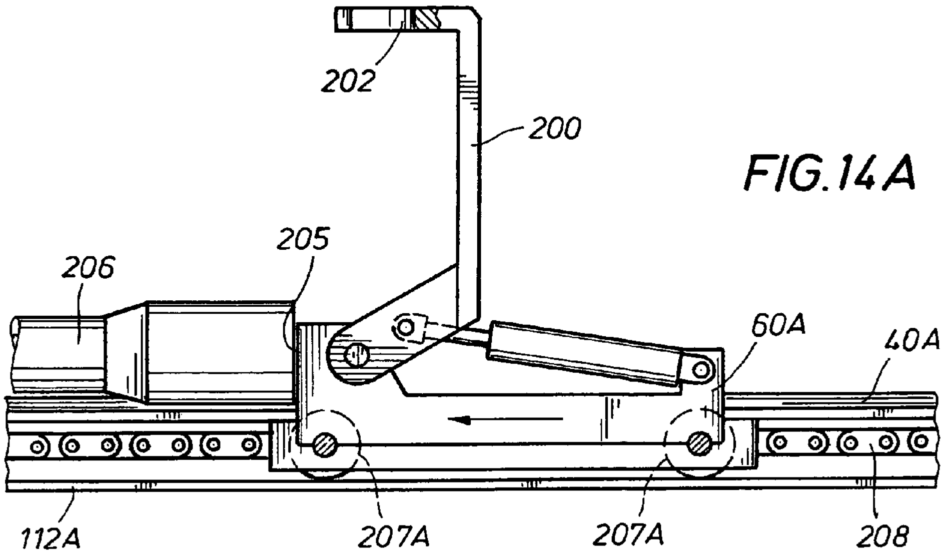
FIG.14A
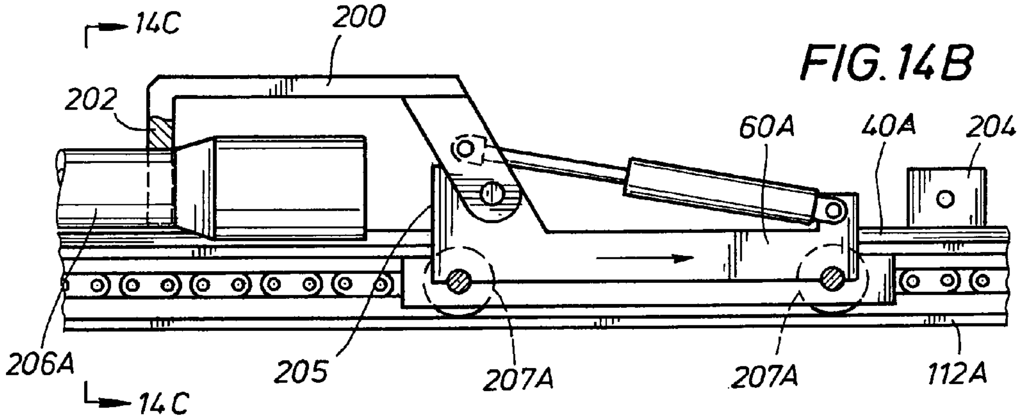
FIG.14B
FIG.14C
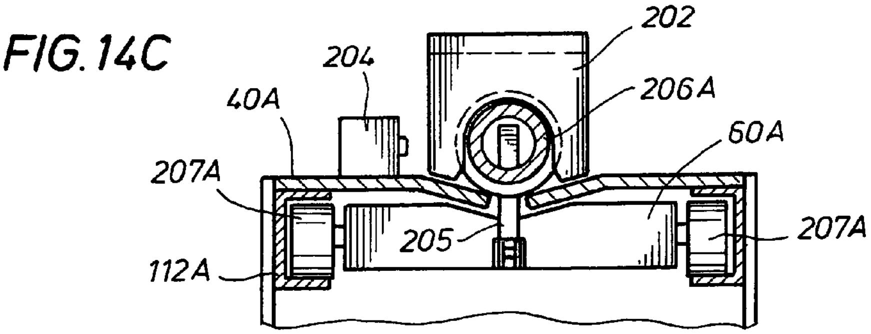

CARTRIDGE TUBULAR HANDLING SYSTEM

CROSS-REFERENCE TO RELATED APPLICATIONS

N/A

STATEMENT REGARDING FEDERALLY SPONSORED RESEARCH OR DEVELOPMENT

N/A

REFERENCE TO MICROFICHE APPENDIX

N/A

BACKGROUND OF THE INVENTION

1. Field of the Invention

The present invention relates to pipe handling systems used in drilling wells on land or offshore.

2. Description of the Related Art

A tubular to be used in drilling is typically first lifted with a crane from a horizontal pipe storage rack located in the pipe deck area outside the drilling structure or derrick on the drilling deck, and then placed horizontally with one end of the tubular near the V-door of the derrick. The tubular may then be moved through the V-door with rig equipment and rotated into the vertical position for either stand building or direct insertion through the well center. The traditional tubular handling process is inefficient and raises safety issues.

Although several horizontal pipe handling systems have been proposed, they rely upon various mechanical pipe moving devices to move a pipe from the top of a pipe rack. U.S. Pat. No. 3,734,210 proposes a pipe transfer assembly having a support arm with a pipe flipper operated with an air cylinder to engage a pipe at the top of a rack and release and push it to a handling arm. Pub. No. U.S. 2008/0101891 proposes a pipe rack with a lifting block mechanism that lifts a pipe over an elevated stop mechanism for it to move to a motorized arm mechanism that rotates and lowers the pipe to an adjacent erector system. Pub. No. U.S. 2007/0031215 proposes a vertically moveable pipe moving assembly with an extendable finger that lifts a tubular over the top of a pipe rack and allows it to move to an attached rotatable arm for movement with the pipe moving assembly vertically down the side of the pipe rack where the rotatable arm rotates to move the pipe to an erector system. U.S. Pat. No. 6,311,788 proposes a vertically moveable pipe removal device with an extendable and rotatable gripping claw to lift and remove a drilling rod part from a drilling rod magazine. U.S. Pat. No. 7,537,424 proposes a pivotable and extendable pipe transfer arm to lift and remove a pipe section from a pipe storage bin. U.S. Pat. No. 6,860,694 proposes a picking column with picking arms to lift and remove a pipe from the top of a pipe rack. Pub. No. U.S. 2003/0196791 proposes a vertical conveyor system with shovel arms that lift and remove a pipe from the top of a pipe rack and transports the pipe up to a series of horizontal conveyor systems.

Pub. No. U.S. 2008/0202812 proposes a pipe rack that preferably stores five tubulars that has a hydraulically operated indexing arm assembly that rolls the tubulars toward a pick up location and hydraulically activated separators isolate one tubular that is to be gripped by a horizontal to vertical arm (see '812 publication ¶ 60).

The above discussed U.S. Pat. Nos. 3,734,210; 6,311,788; 6,860,694; and 7,537,424; and Pub. Nos. U.S. 2003/0196791; 2007/0031215; 2008/0101891; and 2008/0202812 are hereby incorporated by reference for all purposes in their entirety.

Handling numerous heavy tubulars of different sizes in severe drilling environments is known to be challenging for and destructive to mechanical devices. Valuable rig time is lost when the mechanical devices require maintenance and/or repair. A need exists for a pipe handling system that minimizes mechanical devices that require maintenance and/or repair. A need exists for a pipe handling system that may be safely operated with minimal human intervention while creating rig use efficiencies. It would also be desirable to be able to selectively handle tubulars from different tiers of a pipe rack, and to have a reliable way to move a tubular toward the well center.

BRIEF SUMMARY OF THE INVENTION

A system and method are provided for a tubular handling system in which a cartridge of tubulars may be removably positioned with a carriage. The carriage may move the cartridge transversely, vertically, and/or rotationally. The carriage may be positioned adjacent to a tubular receiving member so as to either load tubulars onto the tubular receiving member, or to unload tubulars from the tubular receiving member. The carriage and the tubular receiving member may be disposed with a catwalk structure. Tubulars may be selectively handled from any tier of the cartridge. In one embodiment, a cartridge of tubulars may be positioned between two carriages. A single trolley disposed with the tubular receiving member may both push a tubular toward the well center or pull a tubular away from the well center on the drilling deck.

BRIEF DESCRIPTION OF THE DRAWINGS

A better understanding of the present invention can be obtained with the following detailed descriptions of the various disclosed embodiments in the drawings:

FIG. 14A is a broken section elevational view of a trolley positioned on a track with a hydraulically operated trolley arm in a released position while the trolley is pushing a tubular with a trolley shoulder member.

FIG. 14B is a broken section elevational view similar to FIG. 14A but with the hydraulically operated trolley arm in a pulling position for pulling a tubular, and a position indicator sensor disposed with the tubular receiving member.

FIG. 14C is a section view taken along line 14C-14C of FIG. 14B showing the trolley arm gripper engaging the upset portion of the tubular box end.

DETAILED DESCRIPTION OF THE INVENTION

Figure 1:
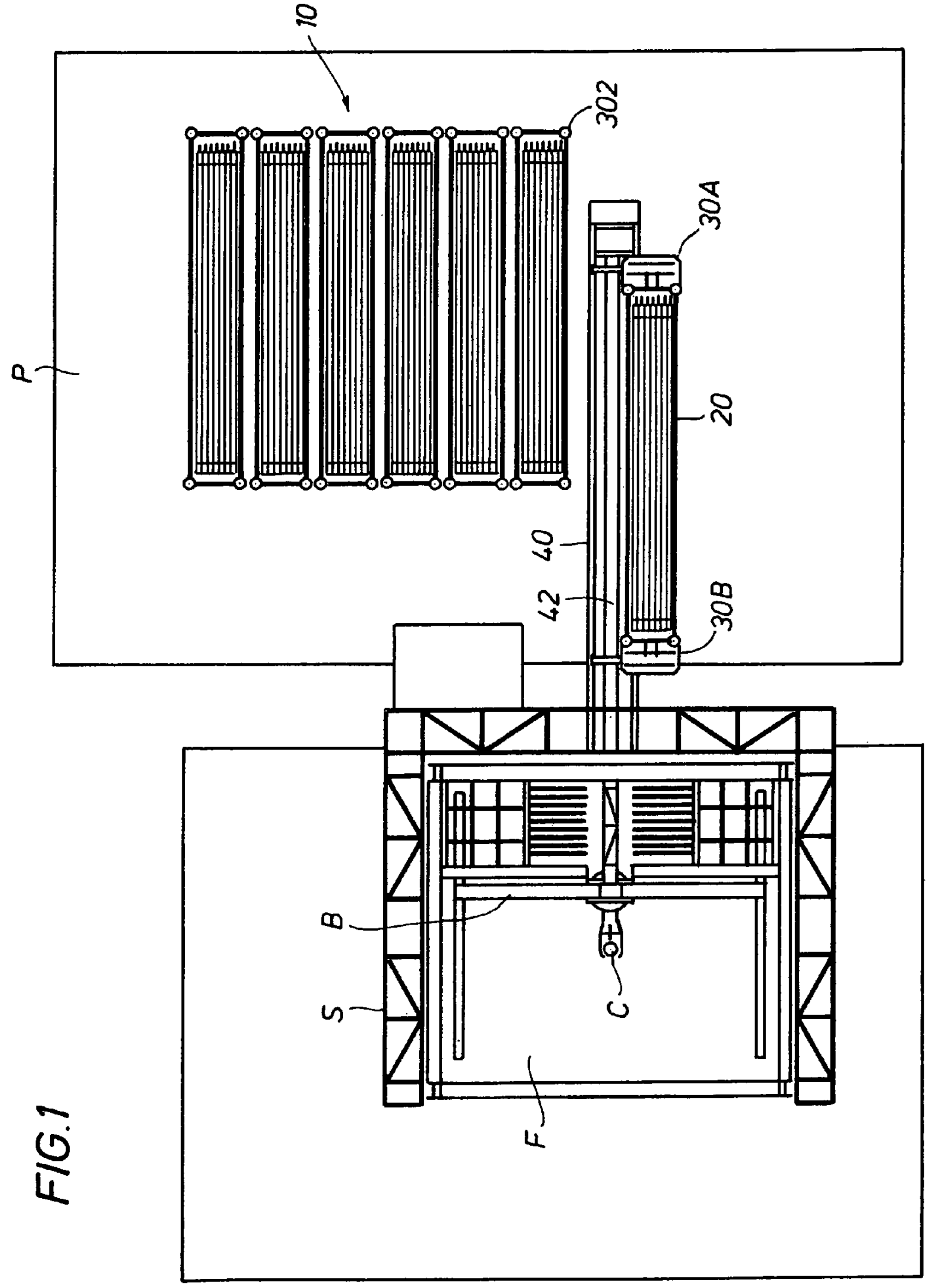
FIG. 1 is a plan view of a cartridge of tubulars positioned between a first carriage and a second carriage both adjacent to a tubular receiving member, six other cartridges of tubulars stored outside the drilling deck, and a bridge racker crane disposed with the drilling structure on the drilling deck.

The tubular handling system may be used in many different drilling environments, including the environment shown in FIG. 1. An exemplary drilling rig or structure for use with the invention is shown as S in FIG. 1. However, drilling rigs S of all configurations and embodiments are contemplated for use with the invention for both offshore and land drilling. For example, the invention is equally applicable to drilling rigs such as jack-up, semi-submersibles, submersibles, drill ships, barge rigs, platform rigs, stationary land rigs, and mobile land rigs. An offshore cantilever jack-up rig is shown in FIG. 1 of Pub. No. 2008/0202812. As used herein, "tubular" refers to drill pipe, drill string, casing, drill collars, and any other tubulars of various sizes that may be used in drilling, completing, or working on a well. In FIG. 1 of the present application, stackable cartridges 10 of tubulars are shown outside the drilling structure S in the pipe deck area P. Other storage locations are contemplated. The tops 302 of each of the four cartridge posts 300 of a cartridge (10, 20), shown in elevation in FIG. 3, may be frusto-conical shaped receiving members sized to receive the bottoms 304 of each of the four cartridge posts 300 of a cartridge, which may be frusto-conical shaped pin members. Other shapes are contemplated. As can now be understood the bottom pin members 304 of the posts 300 of a cartridge may be positioned with the top receiving members 302 of the posts 300 of another cartridge to stack the cartridges.

Cartridge 20 is removably mounted on first carriage 30A and second carriage 30B. A deck crane (not shown) may move any of the cartridges (10, 20) between the cartridge storage area and carriages (30A, 30B). It is contemplated that there may be a plurality of carriages, such as carriages (30A, 30B). Carriages (30A, 30B) are positioned adjacent to tubular receiving member 40. Both carriages (30A, 30B) and tubular receiving member 40 may be in an elevated catwalk area structure mounted near the end of the drill floor F, such as carriage support member 70 shown in FIGS. 3 and 5-9. However, other locations are contemplated. Returning to FIG. 1, it is contemplated that the trough 42 of the tubular receiving member 40 may be set substantially at the same elevation as the drill floor F. Other views of trough 42 are shown in FIGS. 2 & 6-10. In FIG. 1, a bridge racker crane B is disposed with the drilling rig S. In this embodiment the tubular receiving member is aligned with the well center C in drill floor F. However, the tubular receiving member 40 could be aligned with an auxiliary stand building operation, such as the auxiliary stand building operation proposed in Pub. No. U.S. 2008/0202812.

Cartridges (10, 20) may be certified offshore lifting devices. Cartridges (10, 20) may hold single or multiple levels or tiers of tubulars. Cartridges (10, 20) may be handled by any suitable lifting device, such as a four leg lifting sling set and deck crane, a spreader beam assembly and deck crane, or a fork lift truck (onshore). As discussed above, cartridges (10, 20) may be stackable both on the rig pipe deck, on land or other area adjacent to the drilling deck to minimize space required for storage. Cartridges (10, 20) may store and load various sizes of tubulars. Cartridges (10, 20) may be transportable on trailers on land. It is also contemplated that the carriages (30A, 30B) may be used to handle tubulars that are not in a cartridge.

Figure 2:
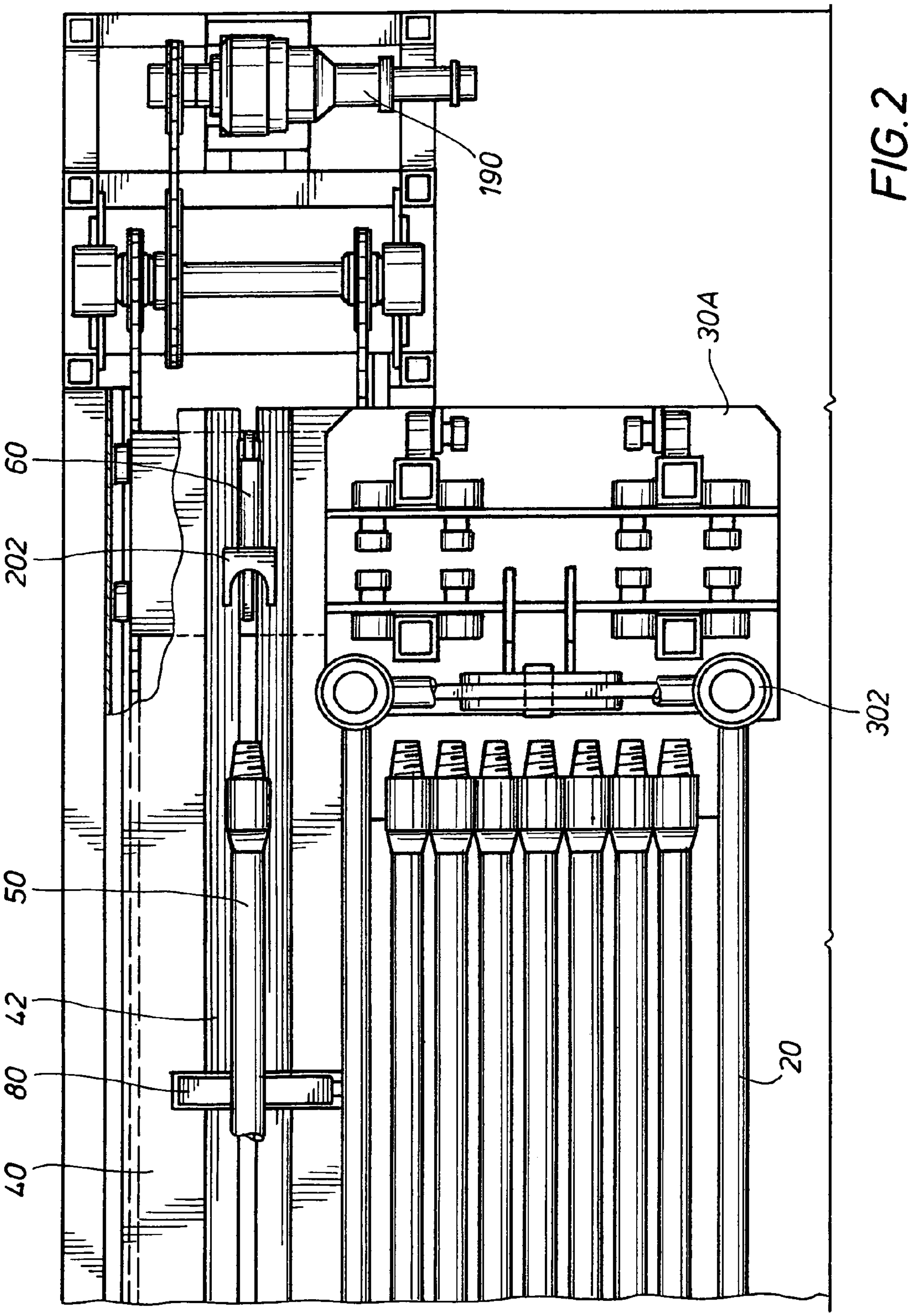
FIG. 2 is a broken partial plan detail view of the first carriage of FIG. 1 showing the cartridge of tubulars positioned on the first carriage adjacent the tubular receiving member, a tubular on the tubular receiving member, and a trolley disposed with the tubular receiving member.
Figure 3:
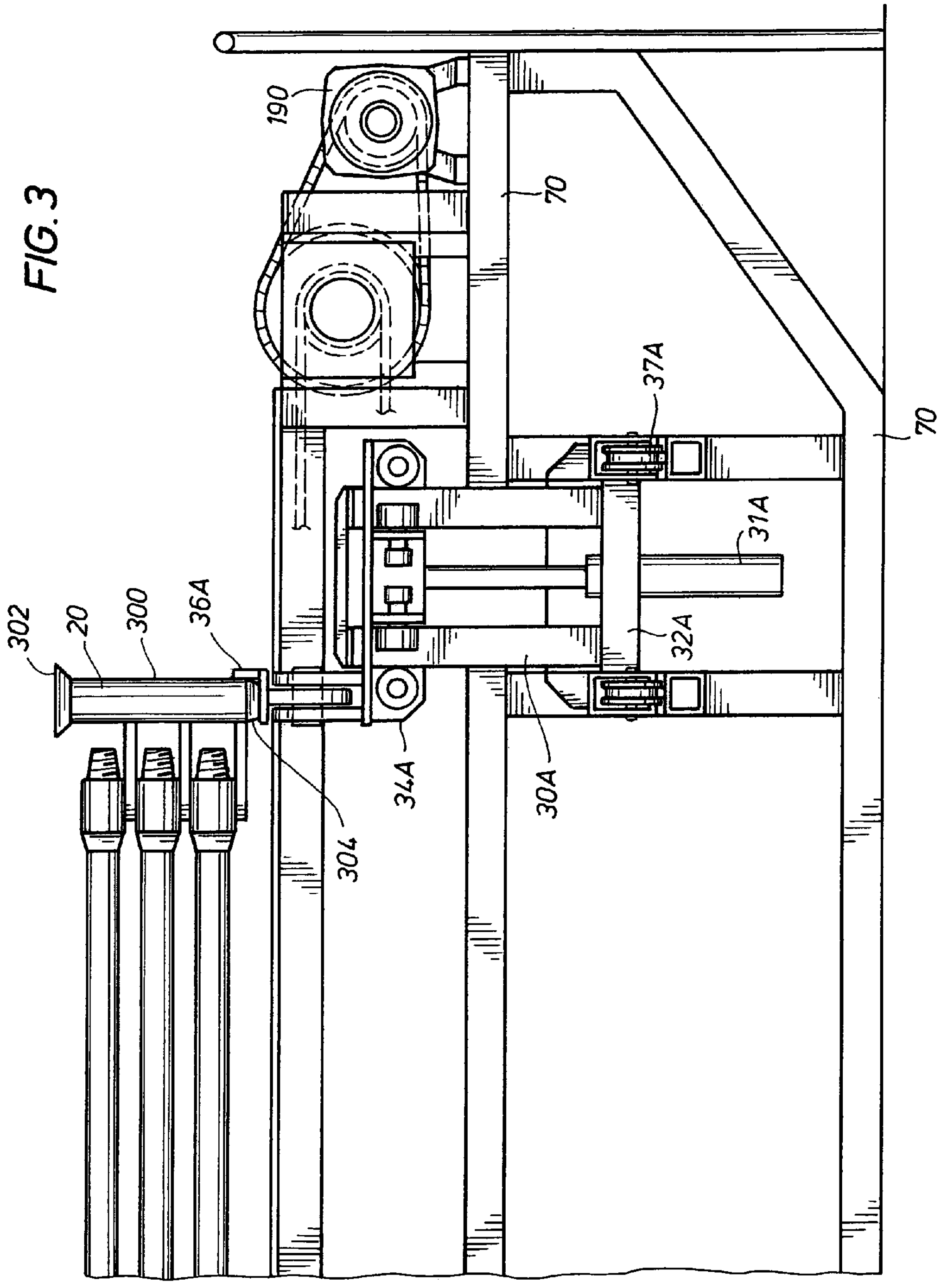
FIG. 3 is an elevational side view of FIG. 2 showing the cartridge of tubulars positioned on the first carriage, the first carriage first structural member, the first carriage second structural member, the first carriage third structural member, and the first carriage disposed with a carriage support member or catwalk structure.
Figure 9:
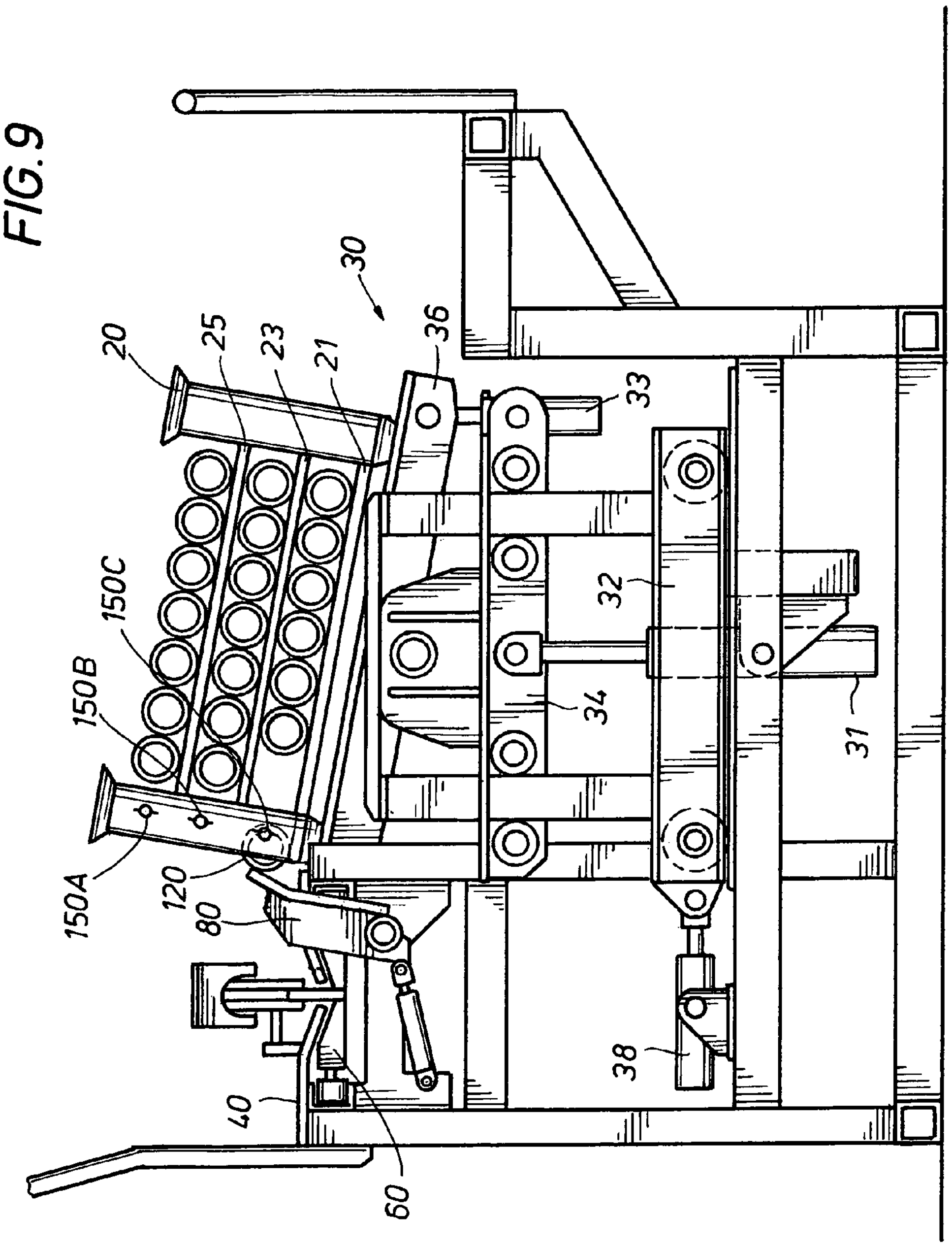
FIG. 9 is a elevational end view of a cartridge of tubulars positioned on a carriage disposed with a carriage support member similar to FIGS. 6 to 8 but with a tubular unloading arm disposed with the carriage support member in the unloading position for unloading a tubular, and wherein the carriage is in an unloading position.
Figure 10:
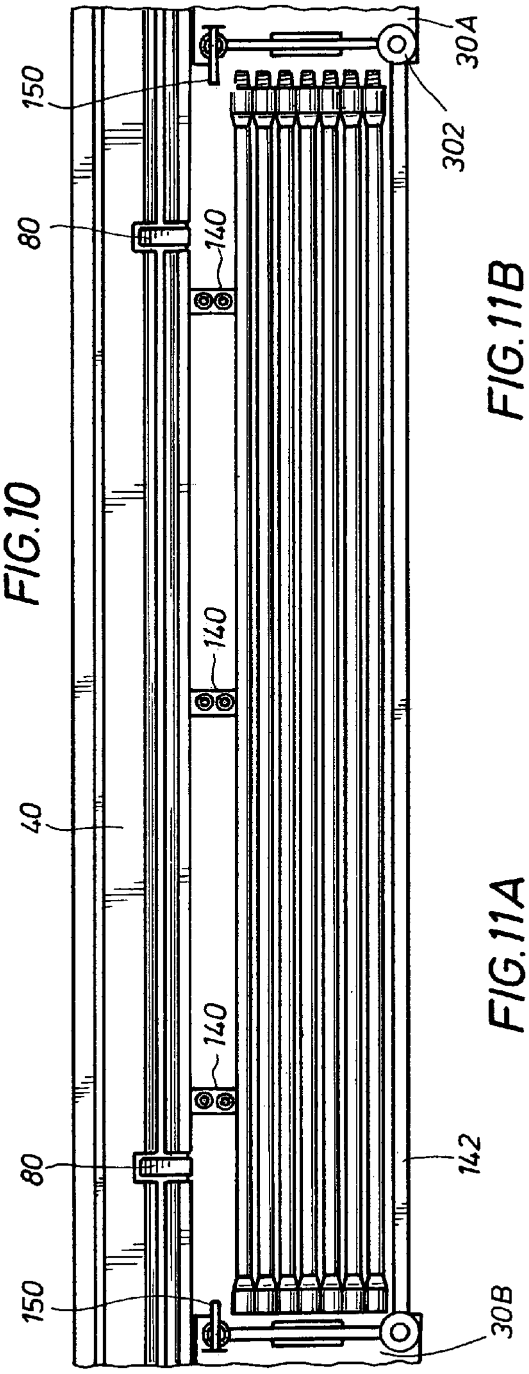
FIG. 10 is a partial section plan broken of a cartridge of tubulars positioned on two carriages adjacent a tubular receiving member, two tubular unloading arms and three tubular indexing systems disposed with the tubular receiving member, and two opposed cartridge tubular retainer members positioned in the cartridge in the extended position to retain the tubulars in the top tier of the cartridge.

FIGS. 2 and 3 show first carriage 30A of FIG. 1. Turning first to FIG. 2, cartridge 20 with tubulars is shown positioned on first carriage 30A adjacent tubular receiving member 40. Tubular 50 is in the trough area 42 of tubular receiving member 40. Trolley 60 with trolley arm gripper 202 is disposed with the tubular receiving member 40. Different embodiments of trolley 60 are shown in FIGS. 14A-14C and 15A-15C and discussed below in detail. Returning to FIG. 2, trolley 60 may be moved using chains linked with trolley motor 190. Other methods of moving trolley 60 are contemplated. It is also contemplated that trolley 60 may be self propelled and/or remotely operated. Tubular unloading arm 80 is also disposed with tubular retaining member 40 and is shown in its retracted or loading position. The operation of tubular unloading arms shown in FIGS. 9 and 10 are discussed below in detail.

FIG. 3 shows cartridge 20 on first carriage 30A, which comprises first carriage first structural member 32A, first carriage second structural member 34A, and first carriage third structural member 36A. First carriage 30A is supported by carriage support member 70. Carriage support member 70 may be the catwalk structure or it may be positioned with the catwalk structure. First carriage first structural member 32A with attached four wheels 37A moves relative to carriage support member 70. First carriage second structural member hydraulic cylinder 31A is attached with first carriage second structural member 34A. Trolley motor 190 may be disposed on structure 70.

Figure 4:
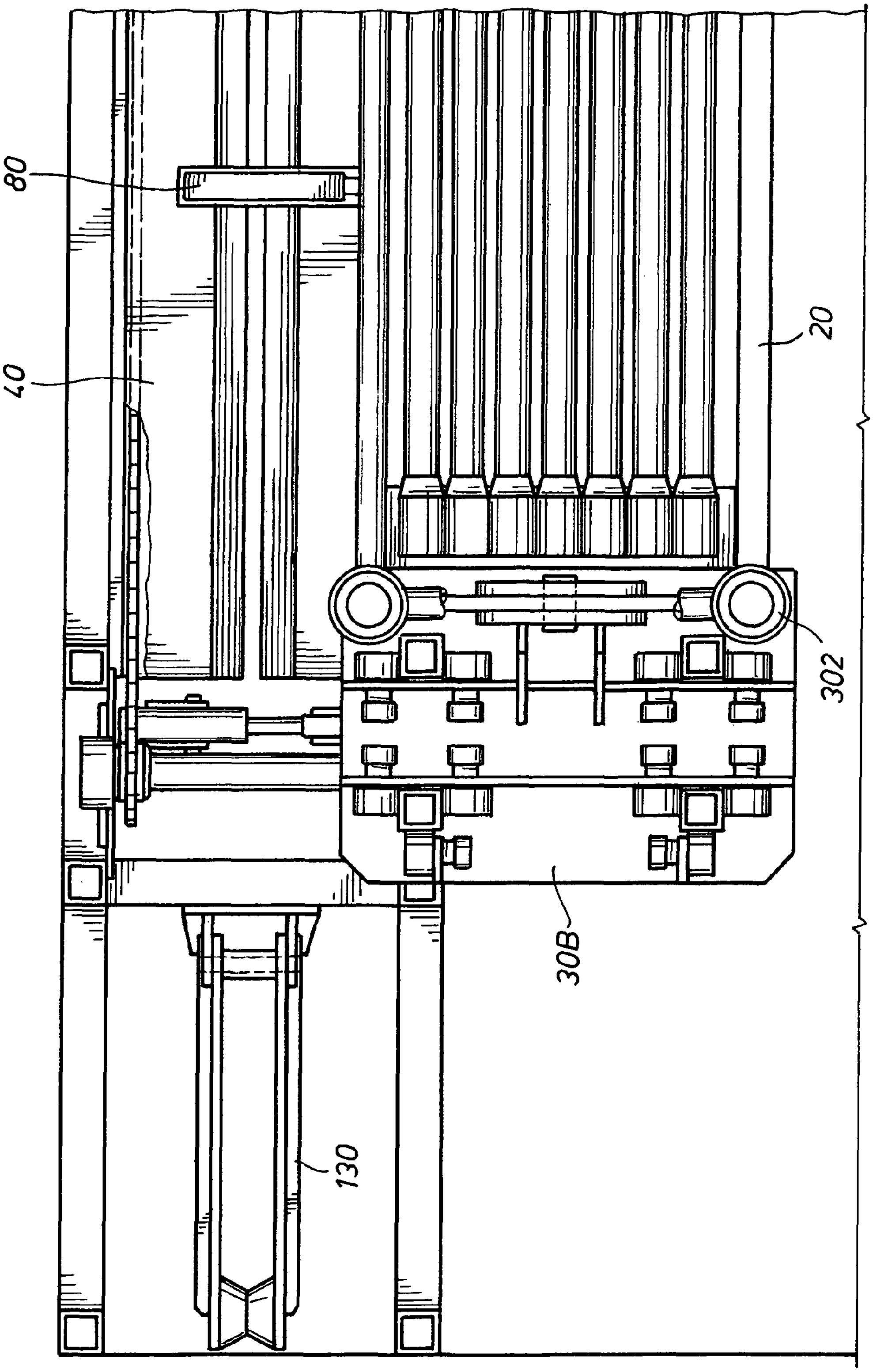
FIG. 4 is a broken partial plan detail view of the second carriage of FIG. 1 showing the cartridge of tubulars positioned on the second carriage adjacent the tubular receiving member, and a tubular elevator or raiser disposed in alignment with the tubular receiving member.
Figure 5:
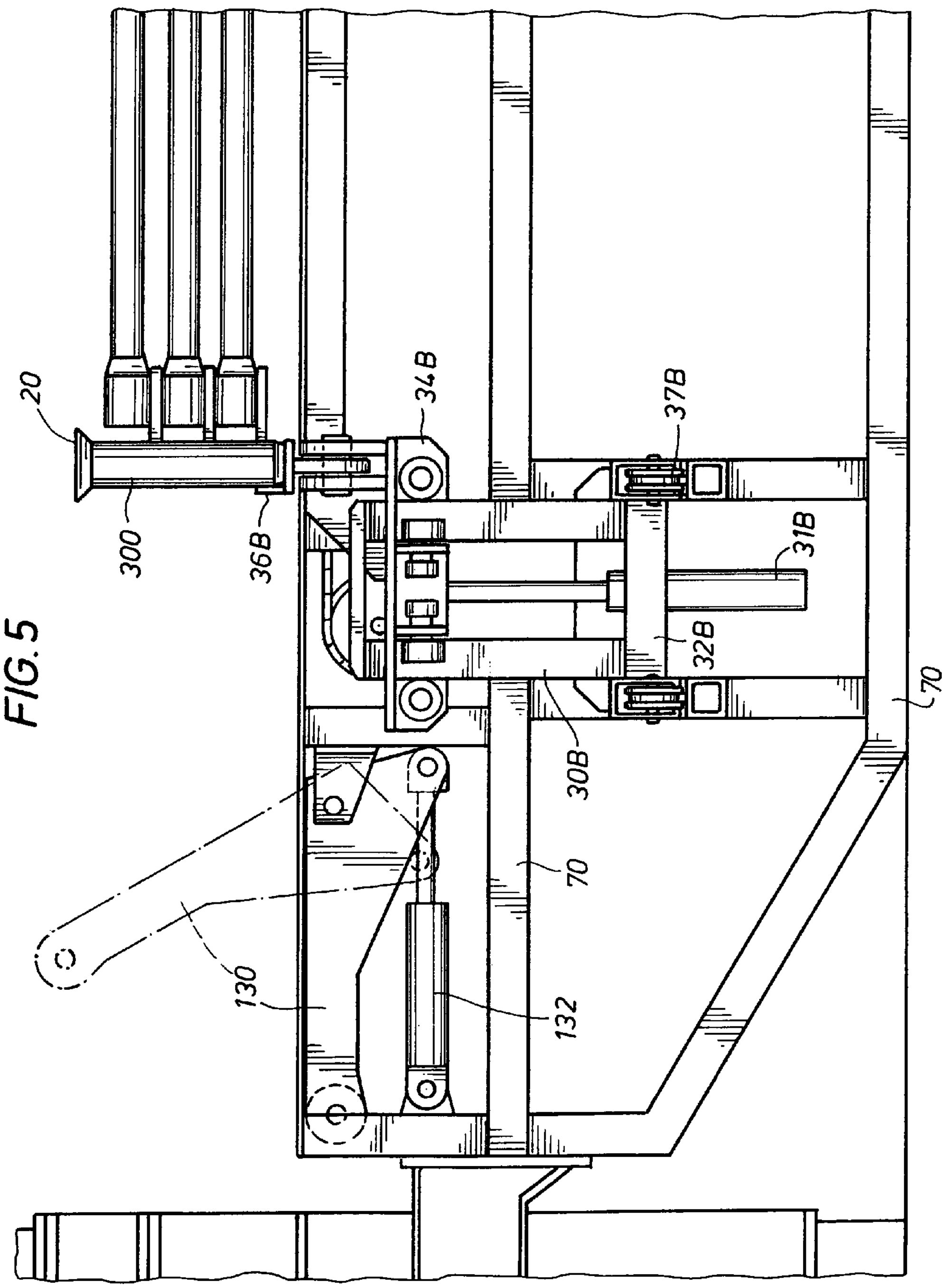
FIG. 5 is an elevational side view of FIG. 4 showing the cartridge of tubulars positioned on the second carriage, the second carriage first structural member, the second carriage second structural member, the second carriage third structural member, the second carriage disposed with a carriage support member, and the tubular raiser shown both in elevation view in a retracted position, and in phantom view in a raised position.

FIGS. 4 and 5 show second carriage 30B of FIG. 1. Tubular unloading arm 80 and tubular elevator or raiser 130 positioned with tubular receiving member 40 are both shown in their retracted positions. As can now be understood and will be discussed below with FIG. 10, there preferably are more than one tubular unloading arm. Turning to FIG. 5, cartridge 20 of tubulars is mounted on second carriage 30B. Tubular raiser or elevator 130 is disposed with carriage support member 70. Tubular raiser 130 is in alignment with tubular receiving member 40 and trolley 60, so that as trolley 60 pushes a tubular toward the tubular raiser 130, tubular raiser 130 elevates one end of the tubular, where tubular raiser 130 is in the position shown in phantom in FIG. 5. Tubular raiser 130 may be remotely hydraulically operated, such as from a control panel (not shown), with tubular raiser hydraulic cylinder 132. It is also contemplated that tubular raiser may be operated mechanically, electrically, electro-magnetically, or some other means. Second carriage 30B comprises second carriage first structural member 32B, second carriage second structural member 34B, and second carriage third structural member 36B. Second carriage 30B is also supported by carriage support member 70. Second carriage first structural member 32B with attached four wheels 37B moves relative to carriage support member 70. Second carriage second structural member hydraulic cylinder 31B is attached with second carriage second structural member 34B.

Figure 6:
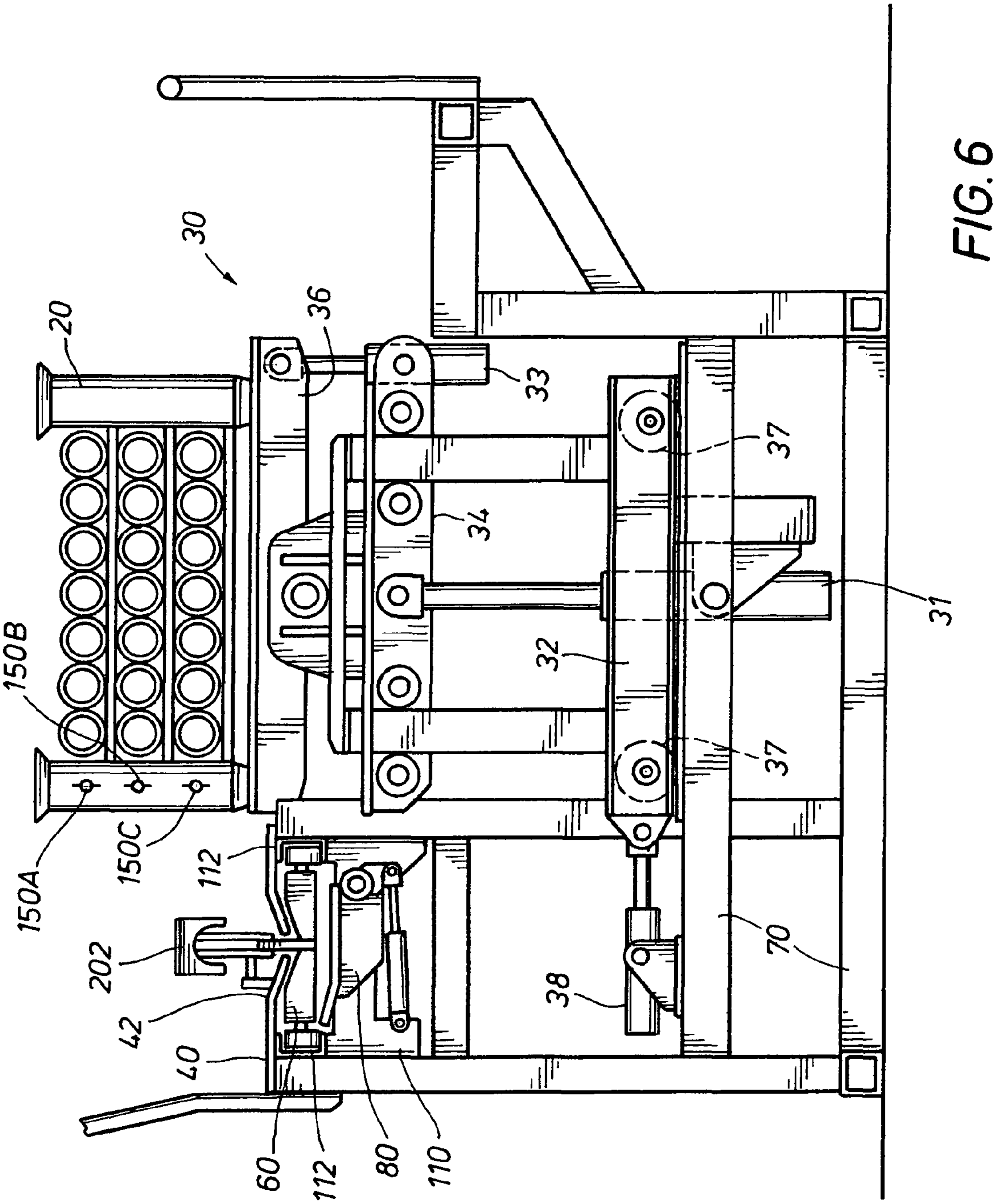
FIG. 6 is a elevational end view of a cartridge of tubulars positioned on a carriage disposed with a carriage support member, a tubular receiving member adjacent the carriage, and a trolley operably positioned on a track with the tubular receiving member, wherein the carriage is in a neutral or horizontal position.

In FIG. 6, carriage 30 is supported by carriage support member 70. Carriage 30 shown in FIGS. 6 to 9 is illustrative of both first carriage 30A and second carriage 30B. It is contemplated that if two carriages are used, such as carriages (30A, 30B) in FIG. 1, they are synchronized to move substantially simultaneously at the same speed and in the same direction(s). Returning to FIG. 6, carriage first member hydraulic cylinder 38 is coupled with carriage first member 32 which is movable transversely on wheels 37 along carriage support member 70. Carriage second member hydraulic cylinder 31 is coupled with carriage second member 34 which is movable vertically relative to carriage first member 32 and carriage support member 70. Carriage third member hydraulic cylinder 33 is attached with carriage third member 36 which is rotationally movable or pivotable relative to carriage first member 32 and carriage second member 34.

Carriage support member 70 also supports tubular receiving member 40. Trolley support member 110 is attached with carriage support member 70 and supports opposed trolley tracks 112 and tubular unloading arm 80. Tubular unloading arm 80 is shown in its retracted or loading position in FIGS. 4-8. One or more tubular unloading arms 80 may be positioned along tubular retaining member 40 as shown in plan view in FIG. 10. It is contemplated that a plurality of unloading arms 80 are synchronized to operate simultaneously at the same speed and in the same direction. While the arms 80 are shown to engage the intermediate portion of the tubulars they could be positioned to engage the upset portion (i.e. box and pin) of the tubular. Returning to FIG. 6, trolley 60 runs on trolley tracks 112. Carriage 30 is shown in the neutral position in which carriage third member 36 is substantially horizontal. Cartridge 20 may be positioned with and removed from carriage 30 while in the carriage neutral position. During normal operations, tubulars are not moved into or out of cartridge 20 while it is mounted on carriage 30 in the neutral position. As can now be understood, carriage 30 may move the cartridge 20 transversely with cylinder 38, vertically with cylinder 31, and/or pivotally with cylinder 33. In other words, carriage third member 36 is tiltable using cylinder 33. Hydraulic cylinders (31, 33, 38) may be used simultaneously, independently and remotely to adjust the position of carriage 30. Other types of mechanisms to adjust the carriage 30 are also contemplated, including mechanical, electrical, and electro-magnetic devices. Cartridge tubular retainer members or pins (150A, 150B, 150C) may be used to either retain tubulars in their respective cartridge tiers or allow the tubulars to roll from the cartridge 20. It is contemplated that pins (150A, 150B, 150C) are also preferably located on the opposite end of carriage 20 that is not shown. Detail disclosure of the pins (150A, 150B, 150C) are shown in FIGS. 11A-11B & 12A-12B and discussed below.

Figure 7:
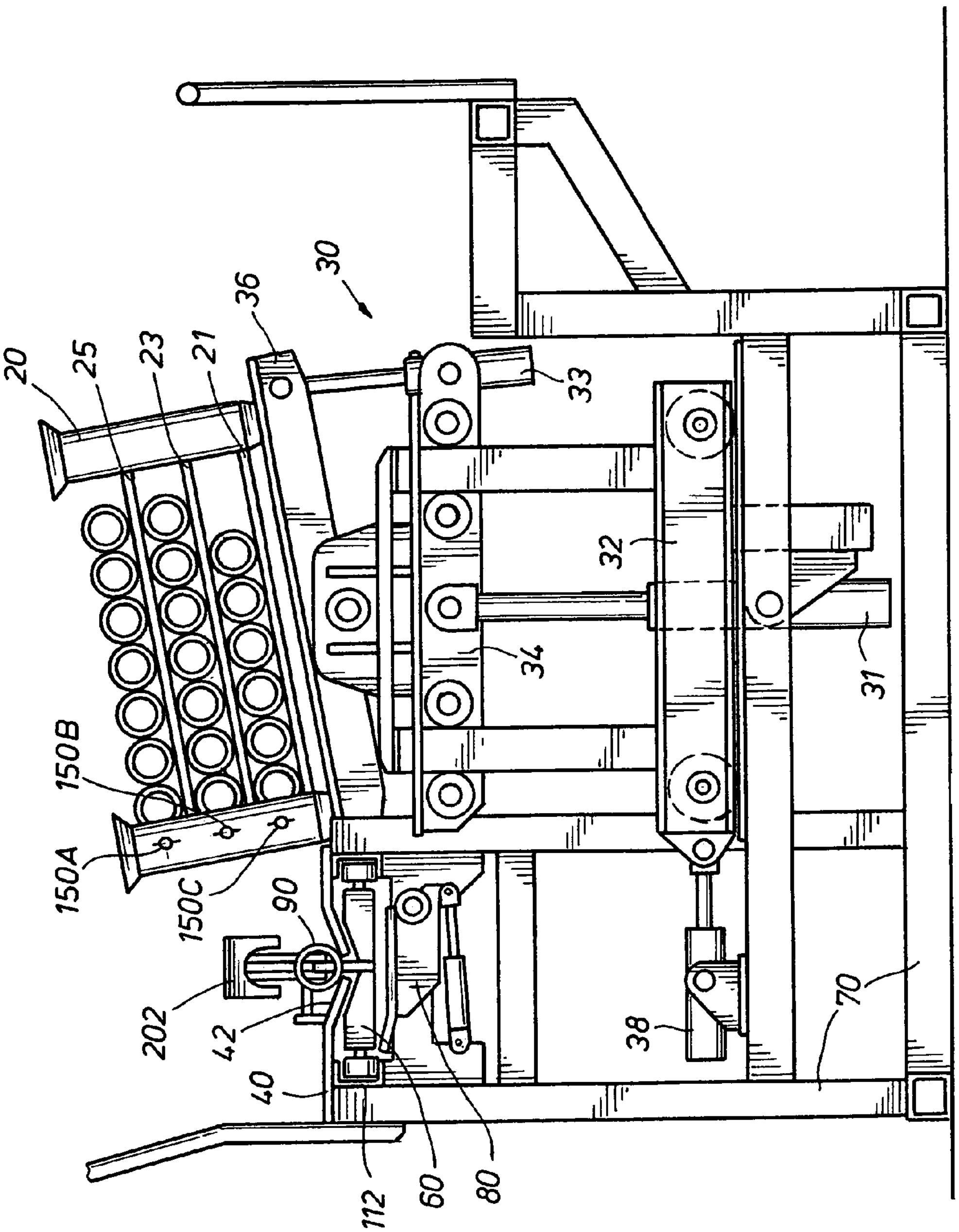
FIG. 7 is a elevational end view of a cartridge of tubulars positioned on a carriage disposed with a carriage support member similar to FIG. 6 but with a tubular on the tubular receiving member, and a trolley operably positioned with the tubular receiving member to push the tubular, wherein the carriage is in the first tubular tier position for loading tubulars onto the tubular receiving member.
Figure 8:
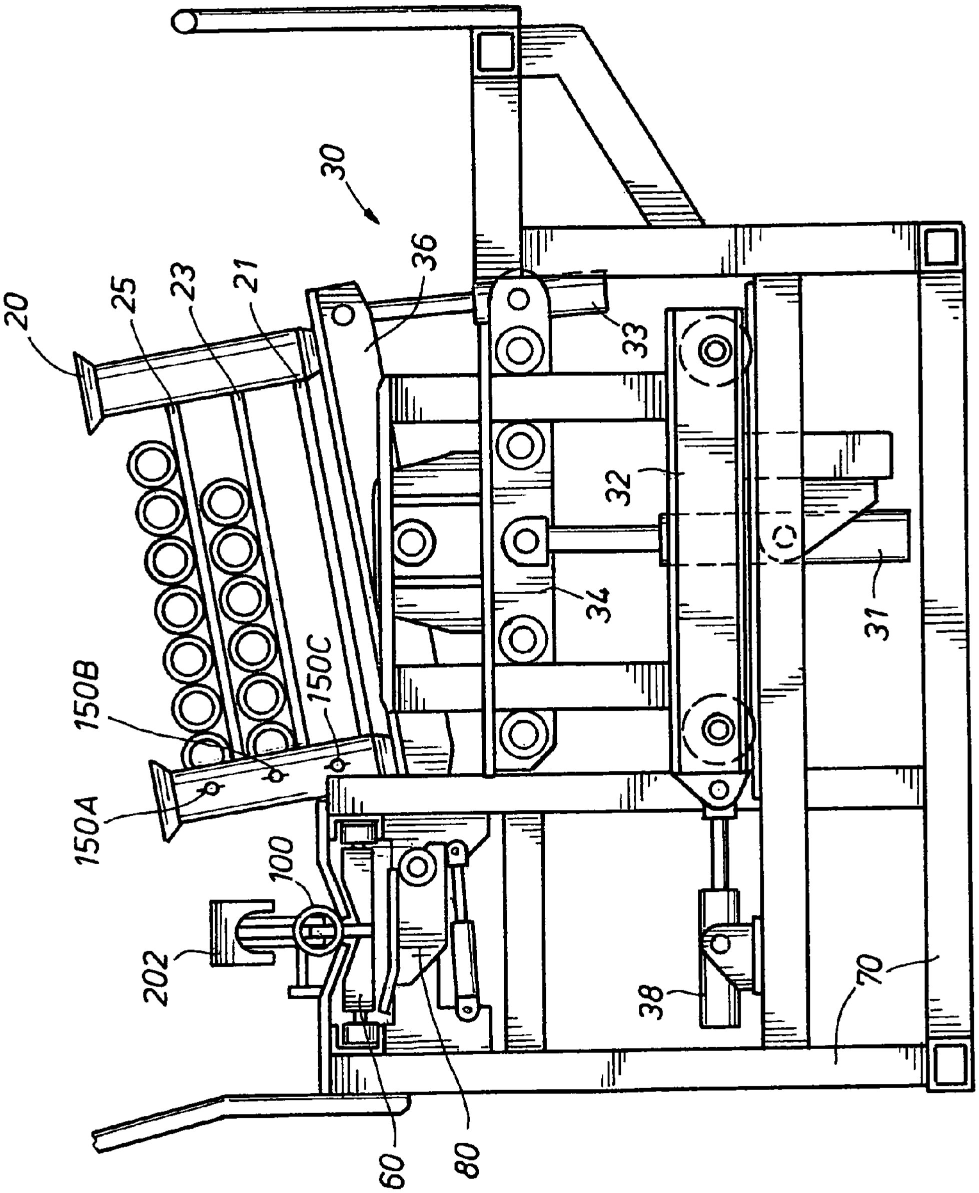
FIG. 8 is a elevational end view of a cartridge of tubulars positioned on a carriage disposed with a carriage support member similar to FIGS. 6 and 7 but with the carriage in the second tubular tier position for loading tubulars onto the tubular receiving member and a tubular on the tubular receiving member from the second tier.
Figure 12A:
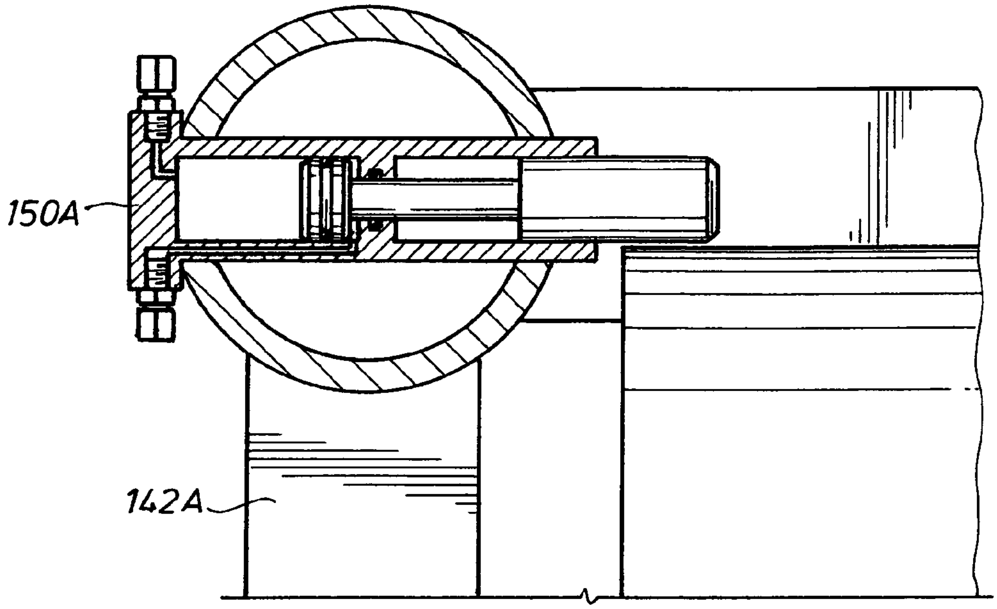
FIG. 12A is a partial broken section plan detail view similar to FIG. 11A but of a remotely operable hydraulic cartridge tubular retainer member or pin in the extended or blocking position.
Figure 12B:
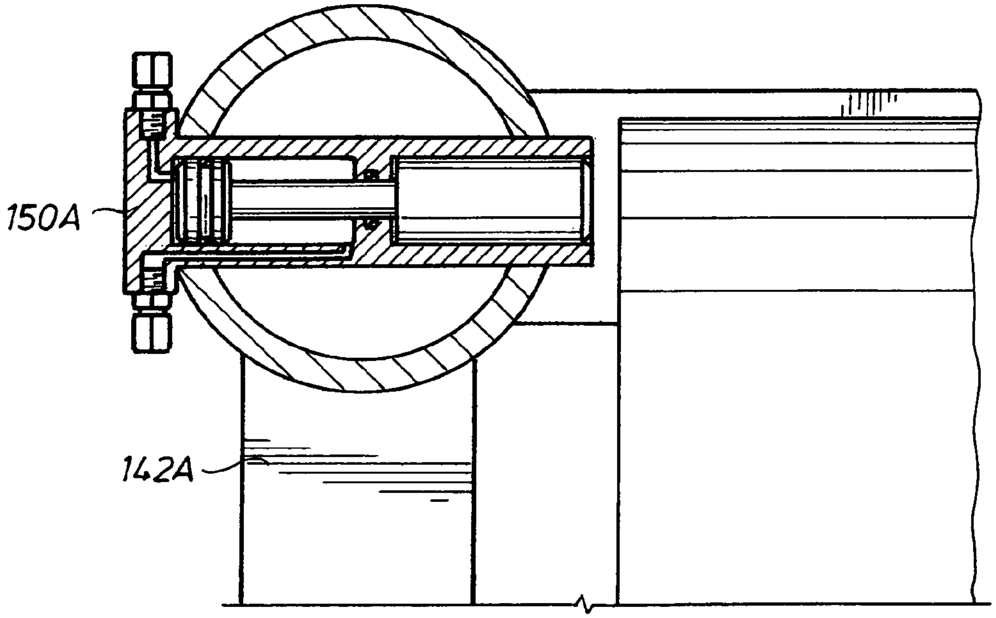
FIG. 12B is a partial broken section plan detail view similar to FIG. 11B but of a remotely operable hydraulic cartridge tubular retainer pin in the retracted or unblocked position.
Figure 13:
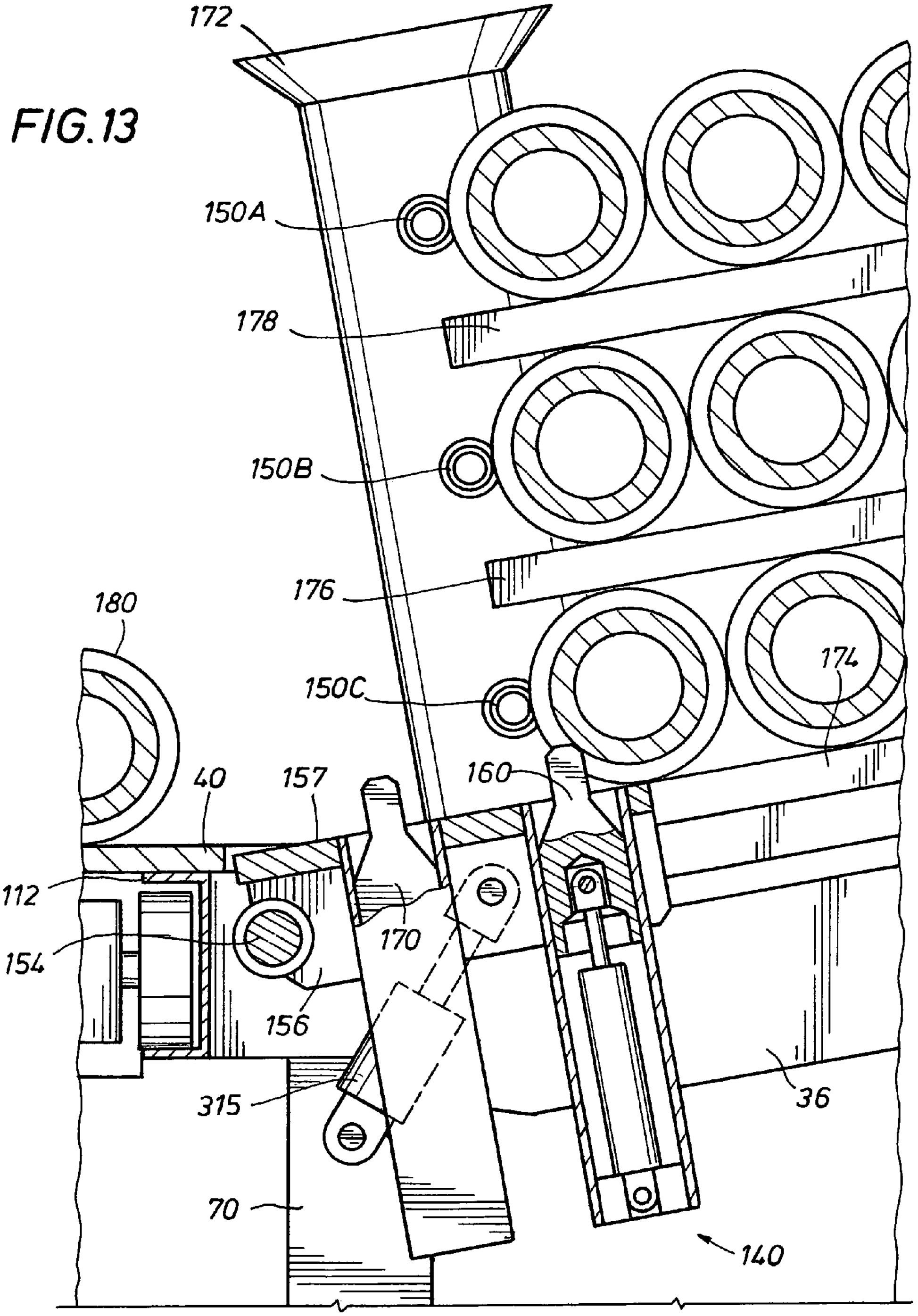
FIG. 13 is a partial section elevational detail view of a cartridge of tubulars on a carriage in a first tubular tier position for loading tubulars on an adjacent tubular receiving member, and two tubular indexing members shown in cut away section view in a tubular indexing system rotationally disposed with the tubular receiving member and positioned for loading, with both tubular indexing members in the extended or blocking position.
Figure 13A:
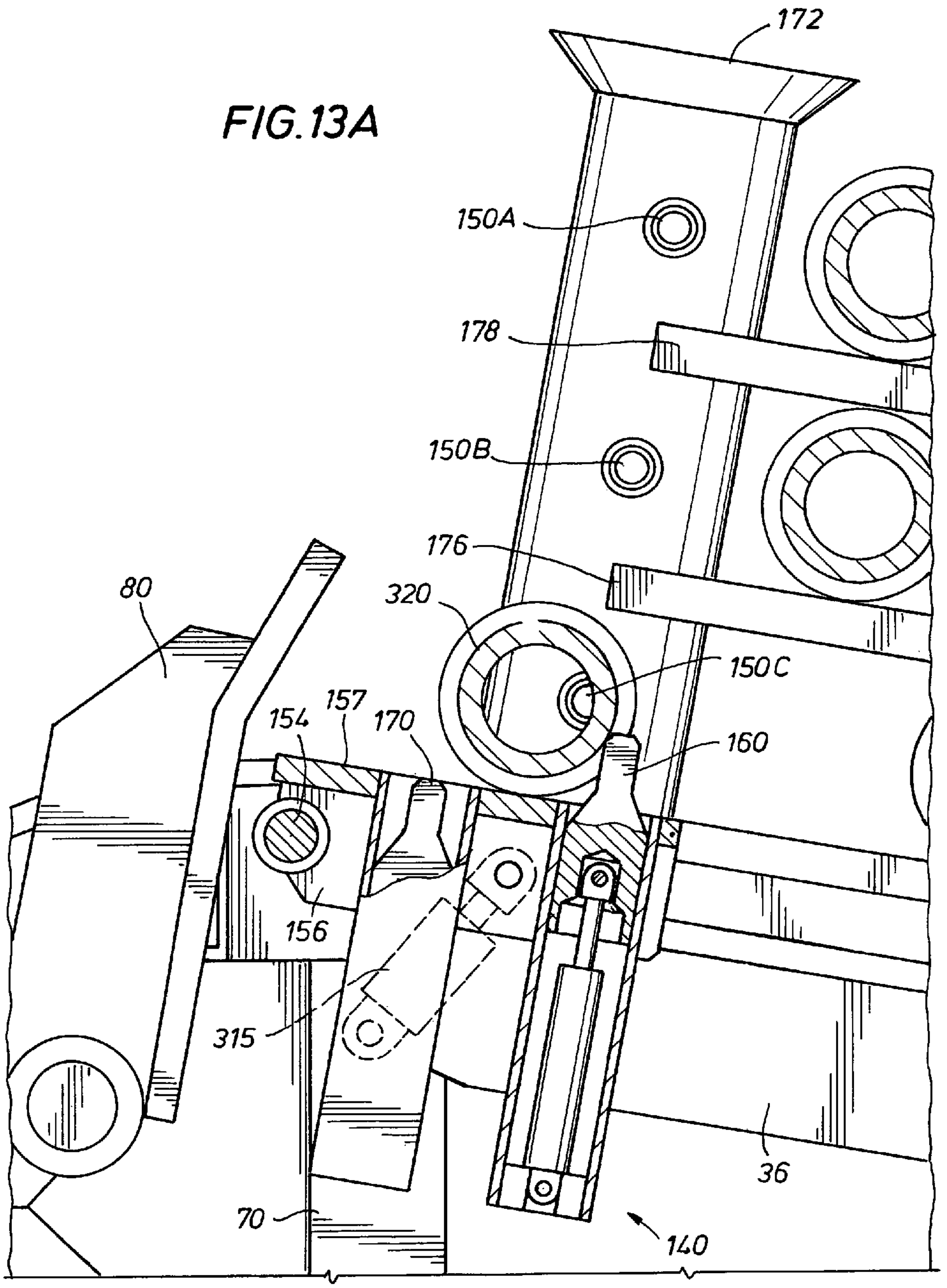
FIG. 13A is a partial section elevational detail view similar to FIG. 13 but of a cartridge of tubulars on a carriage in an unloading position for unloading tubulars from an adjacent tubular receiving member, a tubular unloading arm in the unloading position, and two tubular indexing members shown in cut away section view in a tubular indexing system rotationally disposed with the tubular receiving member and positioned for unloading, with the first tubular indexing member in the extended or blocking position and the second tubular indexing member in the retracted or unblocking position.

Turning to FIG. 7, carriage 30 is in the first tubular tier position for loading tubulars onto the tubular receiving member 40. The preferred angle from horizontal of the first tubular tier position is approximately 10 degrees. However, other angles are contemplated to achieve rolling of the tubulars using only gravity. It is contemplated that the carriage 30 may be positioned adjacent to other equipment different than the tubular receiving member 40 that may handle tubulars in a different manner than the tubular receiving member 40, or that may handle more than one tubular at a time. A tubular 90 in trough 42 of tubular receiving member 40 has already rolled from the cartridge 20 lower level or tier support member 21 through an opening in cartridge 20 for that tier. The controlled gravity movement of a tubular such as tubular 90 from a cartridge using cartridge tubular retainer members (150A, 150B, 150C) and tubular indexing system 140 (not shown in FIGS. 6-9) is described below with FIGS. 10-13. As shown in FIGS. 13 and 13A and discussed below, tubular indexing system 140 may be moveably attached with tubular receiving member 40 for the embodiments shown in FIGS. 6-9 and may span between tubular receiving member 40 and cartridge 20. In FIG. 7, tubulars are also positioned on cartridge middle level or tier support member 23 and upper level or tier support member 25. Turning to FIG. 8, carriage 30 is in the second tubular tier position for loading tubulars onto the tubular receiving member 40. The preferred angle from horizontal of the second tubular tier position is also approximately 10 degrees. However, as discussed above, other angles are contemplated.

A tubular 100 on tubular receiving member 40 has already rolled from the carriage 30 middle level or tier support member 23 through an opening in cartridge 20 for that tier. As can now be understood, cartridge 30 may support multiple levels or tiers of tubulars that are separated by different support members such as members (21, 23, 25). Comparing FIGS. 7 and 8, it can now be understood that when carriage 30 is in the second tubular tier position (FIG. 8), the carriage 30 is positioned farther away from the tubular receiving member 40 by movement of the carriage 30 in the transverse direction by carriage first member hydraulic cylinder 38. Also, when carriage is in the second tubular tier position (FIG. 8), the carriage second member 34 is positioned closer to the carriage first member 32 than in the first tubular tier position. As can now be understood from FIGS. 7 and 8, the carriage 30 advantageously uses only gravity to roll tubulars from the cartridge 20 to the tubular receiving member 40. Further, it can now be understood that tubulars may be selectively loaded onto tubular receiving member 40 from any tier of the cartridge 20. For example, tubulars may first be loaded onto tubular receiving member 40 from cartridge upper tier support member 25, middle tier support member 23, or lower tier support member 21. This advantageously allows for tubulars to be grouped in different levels or tiers, such as according to different types, grades, sizes, or materials.

In FIG. 9, the carriage 30 is in position for unloading tubulars from the tubular receiving member 40 onto cartridge lower level or tier support member 21. Carriage third member 36 has been tilted away from tubular receiving member 40. The preferred angle from horizontal of the unloading position is approximately 10 degrees. However, other angles are contemplated. The use of tubular indexing system 140 (shown with FIGS. 10 and 13A) in unloading is discussed in detail below with FIG. 13A. Returning to FIG. 9, tubular unloading arm 80 is shown in its unloading position for moving tubular 120 from tubular receiving member 40 to the lower level or tier of cartridge 20. Hydraulic cylinders (31, 33, 38) have been adjusted to position carriage 30. The tubulars on the cartridge middle 23 and upper or top 25 support members have previously been moved to the cartridge 20 through the use of the two tubular unloading arm(s) 80. It should be understood that just as a tier of tubulars from cartridge 20 may be selectively chosen to be loaded onto tubular receiving member, likewise any tier of cartridge 20 may be selectively chosen to receive tubulars from tubular receiving member 40. For example, damaged tubulars in need of repair could be positioned on the upper or top member 25.

Turning to FIG. 10, cartridge 142 of tubulars is positioned on two carriages (30A, 30B) adjacent tubular receiving member 40. Two tubular unloading arms 80 are disposed with tubular receiving member 40. As discussed above, other placement locations are contemplated. An elevation view of a single tubular unloading arm 80 was previously shown in FIGS. 6-9. Returning to FIG. 10, three tubular indexing systems 140 are disposed at one quarter, one half and three quarter distance of tubular receiving member 40. Other placement locations are contemplated. Tubular indexing systems 140 may be moveably attached with tubular receiving member 40 and span between tubular receiving member 40 and cartridge 142. A single tubular indexing system 140 is shown in elevation in FIGS. 13 and 13A and discussed below in detail. Returning to FIG. 10, two opposed cartridge tubular retainer members 150 are positioned at each opening in the cartridge 142. Other locations are contemplated. In other words, cartridge retainer pins 150 are preferably located at each of the other tiers of cartridge 142 (as shown in FIGS. 6-9 for cartridge 20), and preferably at both ends of the cartridge 142 as shown in FIG. 10.

Figure 11B:
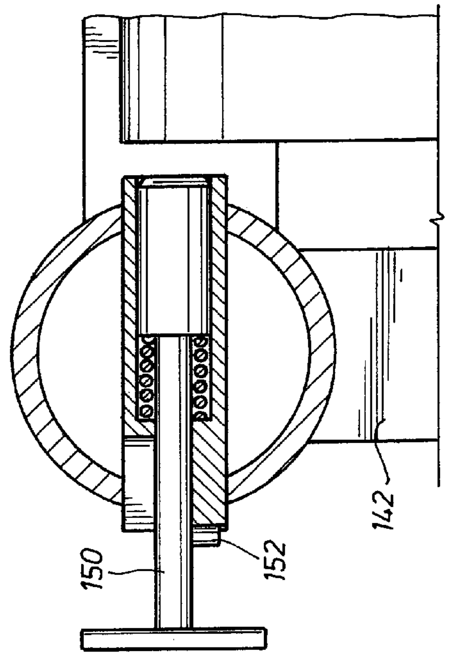
FIG. 11B is a partial broken section plan detail view of a mechanical cartridge tubular retainer pin in the retracted or unblocked position to allow tubulars to roll from a tier of a cartridge.
Figure 11A:
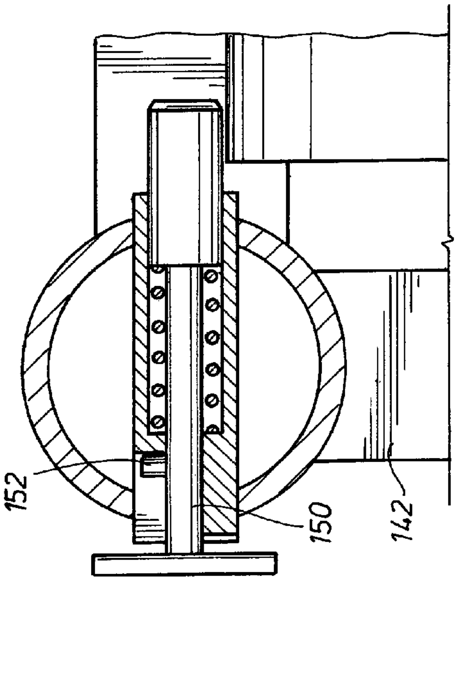
FIG. 11A is a partial broken section plan detail view of a mechanical cartridge tubular retainer member or pin in the extended or blocking position to retain and limit movement of tubulars in a tier of a cartridge.

In FIG. 11A, exemplary cartridge tubular retainer pin 150 is in the extended or blocking position to limit movement of tubulars from a tier of cartridge 142 through an opening in the cartridge. In FIG. 11B, cartridge tubular retainer pin 150 in the retracted or unblocked position to allow movement of tubulars from a tier of cartridge 142 through an opening in the cartridge. Cartridge tubular retainer member or pin 150 may be a mechanical spring loaded device that may be locked in either the blocking position or the unblocked position with pin locking member 152. Cartridge retainer pins may also be hydraulic, electrical, electro-magnetic or other type. Cartridge retainer pins may be remotely operated. Sensors in electrical or wireless communication with a CPU may be used to determine the position of the retainer pin. For example, FIGS. 12A and 12B show an exemplary hydraulically operated cartridge retainer member 150A positioned with cartridge 142A in the blocking and unblocked positions, respectively. It is contemplated that each end of a cartridge (142, 142A) may have a retainer pin (150, 150A) for each tier. Therefore, two retainer pins may be removed (one from each end of a cartridge for that tier) to allow tubulars to roll from a selected tier. It is also contemplated that retainer pins 150 may be positioned with each of the four cartridge posts 300 at each tubular tier level, so as to allow tubulars to move from either side out of each tier of a cartridge, such as if tubular receiving members were positioned on both sides of the carriage and cartridge. It is also contemplated that two quick connect hydraulic lines could be used to communicate hydraulic fluid to/from all hydraulic connections.

FIG. 13 shows cartridge 172 disposed with carriage third member 36 in position for loading tubulars on tubular receiving member 40. Cartridge 172 is positioned on a carriage tilted to allow tubulars to roll along cartridge lower tier support member 174 using only the force of gravity. The cartridge 172 is in the same position as cartridge 20 in FIG. 7. Returning to FIG. 13, tubular retainer members (150A, 150B) are both in the blocking position to limit tubulars from moving on the cartridge upper support member 178 and cartridge middle support member 176. However, the retainer member 150C for lower support member 174 is in the retracted position allowing tubulars such as tubular 180 to roll from the cartridge 172 along lower support member 174 using only the force of gravity.

Tubular indexing system, generally designated 140, with first tubular indexing member 160 and second tubular indexing member 170 is pivotally positioned from tubular receiving member 40 using pivot member 154. Tubular indexing system 140 is shown in the loading position for loading tubulars from cartridge 172 to tubular receiving member 40. The preferred angle from horizontal of the tubular indexing system 140 loading position is approximately 10 degrees. However, other angles are contemplated to achieve rolling of the tubulars using only gravity. It is contemplated that the angle of tubular indexing system 140 in the loading position may be substantially the same angle from horizontal as cartridge 172 in the first tubular tier position. Tubular indexing system hydraulic cylinder 315 may be used to move tubular indexing support member 156. Other methods of moving tubular indexing support member 156 are contemplated. Tubular indexing system hydraulic cylinder 315 may be operated remotely. Tubulars roll across inclined top surface 157 of tubular indexing support member 156 when traveling between cartridge 172 and tubular receiving member 40, such as tubular 180 has already done. Tubular indexing members (160, 170) are shown in their extended or blocking positions.

First tubular indexing member 160 and second tubular indexing member 170 may be hydraulically operated from a remote location, such as the control panel discussed above. Other numbers of tubular indexing or blocking members (160, 170) are contemplated. It is contemplated that tubular indexing system 140 may be mechanical, hydraulic, electrical, electro-magnetic, or other type. It is further contemplated that the three tubular indexing systems 140 may be remotely operated in synchronized fashion. Sensors may be used to determine the positions of indexing members (160, 170). Tubular indexing system 140 may also be adjusted for various sizes of tubulars. Tubular indexing members (160, 170) may be independently extended or retracted, as shown in FIG. 13 for both extended and FIG. 13A for one retracted and one extended. Returning to FIG. 13, first tubular indexing member 160 is extended to block tubulars from rolling from lower support member 174 of cartridge 172, which they would otherwise do after the retainer pins, such as pin 150C, for that tier are retracted.

Tubular 180 has already rolled from the cartridge 172 when first indexing member 160 then the second member 170 were retracted. It is contemplated that when the retainer pin 150C for cartridge lower support member 174 is first retracted after the carriage is in the first tubular tier position, both first tubular indexing member 160 and second tubular indexing member 170 would be in the extended position as shown in FIG. 13 to block rolling of tubulars from the cartridge 172. First tubular indexing member 160 would then be retracted and second tubular indexing member 170 would remain in the extended position to allow a tubular such as tubular 180 to roll from cartridge lower support member 174 using only the force of gravity. First tubular indexing member 160 would then be extended to block tubular 180 between first tubular indexing member 160 and the extended second tubular indexing member 170 and to block other tubulars from rolling from the cartridge 172. Second tubular indexing member 170 would then be retracted to allow tubular 180 to roll from the force of gravity to the trough of the tubular receiving member 40 for handling by the trolley 60. Another tubular may then be handled with the indexing system 140 in similar fashion. It is contemplated that each of the plurality of tubular indexing systems 140 as shown in FIG. 10 would be synchronized to operate substantially simultaneously and in the same manner and direction. The operation of tubular indexing system 140 may be remotely controlled from a CPU or main control unit in an operator's cabin mounted adjacent the tubular receiving member 40, for example on either the drill structure S or the drill floor F.

In FIG. 13A, tubular indexing system 140 is in the unloading position for unloading tubulars such as tubular 320 from tubular receiving member 40 to cartridge 172. The preferred angle from horizontal of the tubular indexing system 140 unloading position is approximately 10 degrees. However, other angles are contemplated to achieve rolling of the tubulars using only gravity. It is contemplated that the angle of tubular indexing system 140 may be substantially the same angle from horizontal as cartridge 172 in the cartridge unloading position. The cartridge 172 is in the same unloading position as shown with cartridge 20 in FIG. 9. Returning to FIG. 13A, tubular unloading arm 80 is in the unloading position to move tubular 320 from tubular receiving member 40. After tubular 320 has been moved by tubular unloading arm 80 the tubular 320 may then roll from the force of gravity across inclined top surface 157 of tubular indexing support member 156 past second tubular indexing member 170 in the unblocking position until being blocked by first tubular indexing member 160 in the blocking position. After the tubular 320 has come to rest against first tubular indexing member 160 as shown in FIG. 13A, first tubular indexing member 160 may be moved to the unblocking position to allow tubular 320 to roll onto cartridge lower tier support member 174 of cartridge 172. Tubular retainer pin 150C would have previously been retracted.

It is also contemplated that other combinations of positions of members (160, 170) may be used, such as second tubular indexing member 170 being in the blocking position to block tubular 320 as it moves from tubular receiving member 40, and first tubular indexing member 160 being in the unblocking position. After the tubular 320 has come to rest against second tubular indexing member 170, second tubular indexing member 170 may be moved to the unblocking position to allow tubular 320 to roll past the unblocked first tubular indexing member 160 onto cartridge lower tier support member 174 of cartridge 172. It is also contemplated that both indexing members (160, 170) may remain in the unblocking position during unloading so that a tubular such as tubular 320 may not be blocked by either indexing member (160, 170) as it moves from tubular receiving member 40 to cartridge 172.

Turning to FIG. 14A, trolley 60A moves along track 112A with trolley wheels 207A, shown in phantom. Track 112A may be disposed below tubular receiving member 40A, as shown in FIGS. 14A-14C. Trolley 60A and track 112A may be positioned similarly to trolley 60 and track 112 shown in FIGS. 6-9. In FIG. 14A, trolley 60A may be moved with chain 208. As discussed above, other methods of trolley propulsion are contemplated. Trolley arm 200 may be hydraulically operated from a remote location using wireless communication. Trolley arm 200 is in a released position while the trolley 60A is pushing tubular 206 with trolley shoulder member 205.

In FIG. 14B trolley arm 200 is in a pulling position with trolley arm gripper 202 (also shown in FIGS. 14A and 14C) engaged with the upset portion of tubular 206A at the tubular box end. Trolley arm 200 is in the pulling position while the trolley 60A is pulling tubular 206A. Position indicator device or sensor 204, disposed above track 112A, may detect when trolley 60A is in a predetermined position so as to signal an actuator or CPU to signal the remote movement of trolley arm 200 to the released position. Sensor 204 may be mechanical, electrical, optical, electro-magnetic, or some other type. A similar sensor may be positioned at the other end of the track in a predetermined location where the trolley engages a tubular to be pulled so as to signal when the trolley arm 200 may be lowered to engage the tubular, as shown in FIGS. 14B and 14C. In FIG. 14C, trolley arm gripper 202 is shown engaged with tubular 206A.

Figures 15A, 15B, 15C:
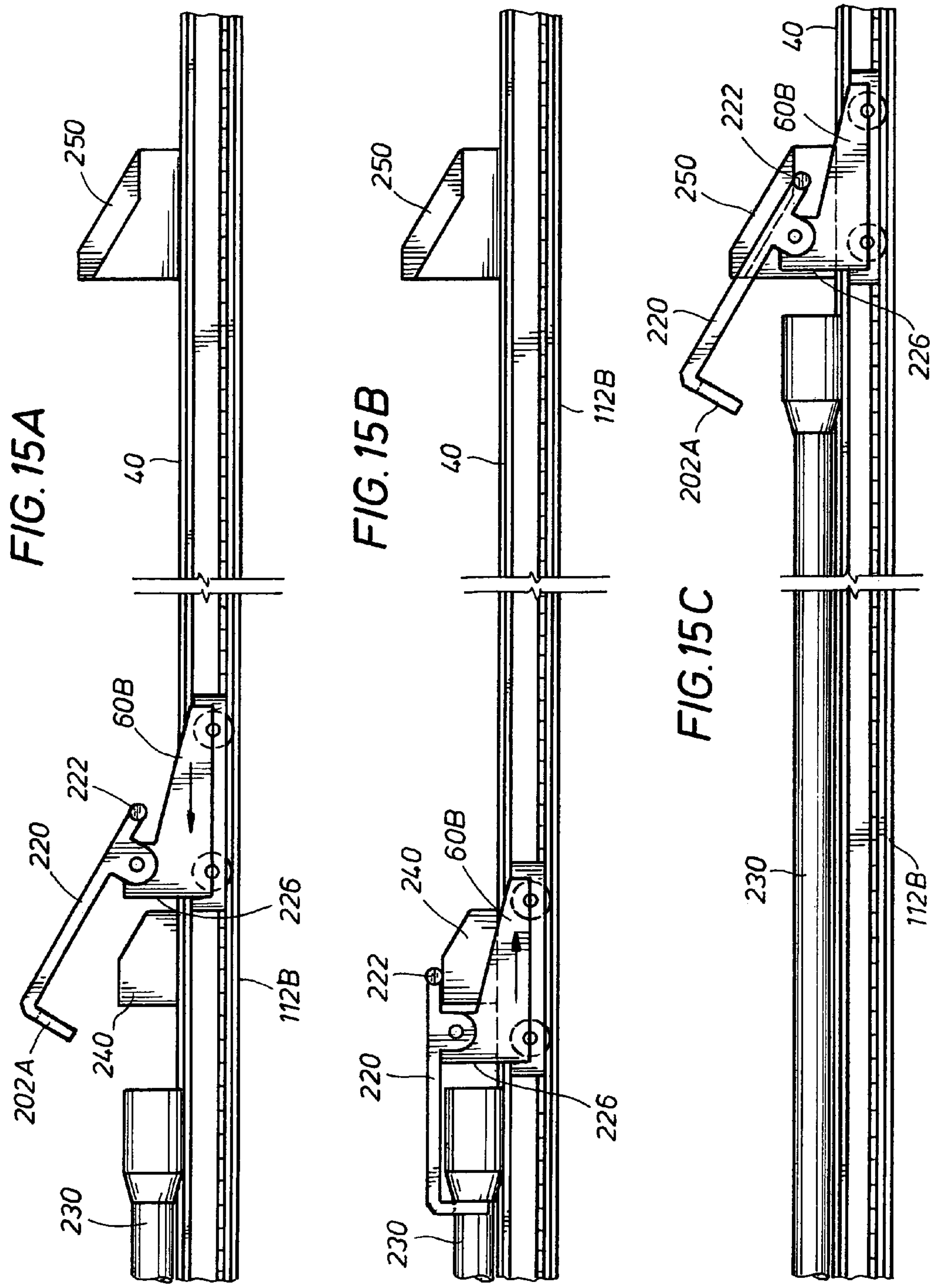
FIG. 15A is a broken section side elevational view where on the left side a trolley is positioned on a track with a mechanically operated trolley arm in a released position while the trolley moves toward a tubular, and an engagement ramp member is disposed with the tubular receiving member, and on the right side a release ramp member is disposed with the tubular receiving member.
FIG. 15B is a broken section side elevational view similar to FIG. 15A where on the left side the trolley mechanically operated trolley arm is in the engaged or pulling position after the engagement ramp member has urged the trolley arm to engage so the trolley can pull the tubular.
FIG. 15C is a broken section side elevational view similar to FIGS. 15A and 15B where on the right side the trolley mechanically operated trolley arm is in the released position after the release ramp member has urged the trolley arm to release the tubular.

Turning to FIG. 15A, trolley arm 220 of trolley 60B comprises trolley arm gripper 202A and dog member 222. Trolley arm gripper 202A may be similar to gripper 202 in FIGS. 14A-14C. Returning to FIG. 15A, trolley shoulder member 226, similar to shoulder 205 in FIG. 14A, pushes a tubular. However, FIGS. 15A-15C illustrate pulling of a tubular 230 away from the derrick S or well center C along tubular receiving member 40. As trolley 226 moves toward tubular 230 in FIG. 15A, the dog member 222 engages the trolley engagement ramp member or device 240, causing the arm gripper 202A to engage tubular 230 as shown in FIG. 15B. The trolley 60B then pulls the tubular 230 as shown in FIG. 15B. When the trolley dog member 222 engages the trolley release ramp member or device 250, as shown in FIG. 15C, at a predetermined location the trolley arm gripper 202A is released from the tubular 230. Tubular 230 is then ready for moving from the tubular receiving member 40 to a cartridge, such as shown in FIG. 9. As can now be understood, trolley arm 220 may be mechanically operated by ramp members (240, 250) positioned at predetermined locations with tubular receiving member 40 above track 112B. Other mechanical operations are also contemplated.

Method of Use

As used hereafter, unless otherwise stated, loading refers to loading tubulars from a cartridge to a tubular receiving member 40. Unloading refers to unloading tubulars from a tubular receiving member 40 to a cartridge. For loading operations, a cartridge containing tubulars may be positioned between two carriages. In the preferred embodiment, the cartridge is positioned on two carriages (30A, 30B) as shown in FIG. 1. In the preferred embodiment, the carriages (30A, 30B) are synchronized to move substantially simultaneously at the same speed and in the same direction(s). Therefore, the method described below for one carriage 30 applies for the other carriage(s). The cartridge 20 is preferably positioned with the carriage 30 when the carriage is in the neutral position, as shown in FIG. 6. The carriage 30 may be pivoted or tilted as shown in FIGS. 7 & 13 in a first tubular tier position for loading the tubulars one at a time on a tubular receiving member 40 from the cartridge 20. Carriage first member hydraulic cylinder 38, carriage second member hydraulic cylinder 31, and carriage third member hydraulic cylinder 33 are used to move carriage to other tubular tier positions. Cartridge retainer members (150A, 150B, 150C), such as shown in FIG. 13, may be left in the blocking or extended position for the tiers that tubulars are not being rolled from the cartridge. Upon retracting the selected cartridge retainer member (150A, 150B, 150C) the force of gravity urges the tubulars to roll along the respective cartridge support member, such as cartridge lower support member 174 in FIG. 13.

Before the retainer pin 150C for cartridge lower support member 174 is retracted and before the carriage is tilted to the first tubular tier position, tubular indexing system 140 is moved in the loading position as shown in FIG. 13. Both first tubular indexing member 160 and second tubular indexing member 170 are extended to limit movement of tubulars from the cartridge 172. First tubular indexing member 160 is then retracted with second tubular indexing member 170 remaining in the extended position to allow a tubular, such as tubular 180, to roll from cartridge lower lever support member 174 using only the force of gravity. First tubular indexing member 160 is then extended to trap or block tubular 180 between first tubular indexing member 160 and second tubular indexing member 170, and to block other tubulars from rolling from the cartridge 172. Second tubular indexing member 170 would then be retracted to allow tubular 180 to roll, again only using the force of gravity, to the trough of the tubular receiving member 40 for handling by a trolley. Each of a plurality of tubular indexing systems 140 as shown in FIG. 10 would be synchronized to operate substantially simultaneously and in the same manner and direction. Other methods of operation of the tubular indexing system 140 are contemplated, including different patterns of blocking and unblocking with indexing members (160, 170).

A tubular loaded from the cartridge on the tubular receiving member may then be pushed by trolley (60, 60A, 60B) using trolley shoulder member (205, 226) along tubular retainer member 40 toward the drilling deck. The tubular raiser 130, shown FIGS. 4 and 5, is then lifted, as shown in phantom in FIG. 5, to raise the end of the tubular closest to the drilling structure S to an elevated position for movement by other rig equipment. The trolley is then moved back on the tubular receiving member 40 into position for movement of another tubular on the tubular receiving member rolled through the tubular indexing system 140 using gravity. The process is repeated until all the tubulars from a tier of the cartridge have rolled from the cartridge.

The carriage may then be moved into the second tubular tier position, as shown in FIG. 8. Carriage first member hydraulic cylinder 38, and carriage second member hydraulic cylinder 31, may be used to move carriage 30 from the first tubular tier position to the second tubular tier position. The retainer pin (150A, 150B, 150C) for the selected cartridge tier is then removed, and the process of loading the tubulars, one at a time, on the tubular receiving member 40 may be repeated as described above. When the cartridge is empty, the carriage is then placed in the neutral position, and the cartridge is removed and replaced with another cartridge containing tubulars as needed loaded. It is contemplated that the cartridge tiers may be unloaded or loaded in other sequences. For example, it is contemplated that the upper tier of the cartridge may be the first tier to be loaded onto tubular receiving member 40. It is also contemplated that carriage 30 may be positioned adjacent to other equipment different than the tubular receiving member 40 that may handle tubulars in a different manner than the tubular receiving member 40, or that may handle more than one tubular at a time.

For unloading operations, one end of a tubular used on the derrick S may be placed by rig equipment on the tubular receiving member 40. As shown in FIGS. 14A-14C, 15A & 15B, trolley (60A, 60B) may be moved and positioned with tubular receiving member 40. A sensor positioned with the tubular receiving member 40 or a ramp member 240 signals or urges the trolley arm (200, 220), respectively, to engage the tubular. The trolley pulls the tubular away from the rig along the tubular receiving member 40. The release ramp member 250 or the position indicator device 204 moves or signals the trolley arm (200, 220) to be moved to released position at a predetermined location along the tubular receiving member. The carriage is tilted as shown in FIG. 9 and the retainer member (150A, 150B, 150C) for the cartridge level to be loaded is retracted. The tubular indexing system(s) 140 are moved to the unloading position as shown in FIG. 13A. The second tubular indexing member 170 is in the unblocking position and the first tubular indexing member 160 is in the blocking position.

Unloading arm(s) 80 are used to unload the tubular from the tubular receiving member 40 to the tubular indexing system(s) 140. After a tubular has come to rest against the first tubular indexing member 160, the first tubular indexing member 160 may be retracted to allow the tubular to roll from the force of gravity onto the cartridge. In FIG. 9, tubulars have already been unloaded from the tubular receiving member 40 and loaded onto cartridge upper 25 and middle 23 support members. However, it is contemplated that the cartridge may be loaded in any sequence. For example, the lower tier of the cartridge may be loaded before any other tier. Carriage first member hydraulic cylinder 38, carriage second member hydraulic cylinder 31, and carriage third member hydraulic cylinder 33 may be used to move carriage member 36. When a tier of the cartridge has been filled, the corresponding retainer pins (150A, 150B, 150C) may be inserted to limit the tubular movement in the cartridge. The process described above may be repeated until the cartridge has been filled. The carriage is then placed in the neutral position, and the cartridge replaced with an empty cartridge so that more tubulars can be unloaded from the tubular receiving device 40.

The foregoing disclosure and description of the invention are illustrative and explanatory thereof, and various changes in the details of the illustrated apparatus and system, and the construction and method of operation may be made without departing from the spirit of the invention.

We claim:

1. A tubular handling system, comprising:

a tubular receiving member;

a carriage support member, said carriage support member disposed relative to said tubular receiving member;

a carriage comprising:

a carriage first member moveable relative to said carriage support member, a carriage second member movable relative to said carriage first member, and a carriage third member movable relative to said carriage second member, wherein said carriage is moveable between a first tubular tier position and a second tubular tier position, wherein in said second tubular tier position said carriage is positioned farther away from said tubular receiving member than in said first tubular tier position, wherein in said second tubular tier position said carriage second member is positioned closer to said carriage first member than in said first tubular tier position, and wherein said carriage third member moveable between a neutral position and an inclined position to move a tubular to said tubular receiving member; and a carriage first member hydraulic cylinder coupled to said carriage for moving said carriage between said first tubular tier position and said second tubular tier position.

2. The tubular handling system of claim 1, further comprising:

a replaceable cartridge removably disposed with said carriage third member.

3. The tubular handling system of claim 2, wherein said cartridge having a first tier of tubulars and a second tier of tubulars.

4. The tubular handling system of claim 1, wherein said tubular receiving member having a trolley.

5. The tubular handling system of claim 1, wherein said carriage having a plurality of wheels, said plurality of carriage wheels rolling on said carriage support member.

6. The tubular handling system of claim 1, further comprising:

a carriage second member hydraulic cylinder for moving said carriage second member between said first tubular tier position and said second tubular tier position.

7. The tubular handling system of claim 1, wherein said neutral position is a substantially horizontal position parallel to said carriage second member, said system further comprising:

a carriage third member hydraulic cylinder for moving said carriage third member between said substantially horizontal position and said inclined position.

8. The tubular handling system of claim 1, wherein said tubular receiving member comprising:

a tubular indexing system comprising a first indexing member and a second indexing member, wherein said first indexing member and said second indexing member being independently moveable for blocking the rolling of a tubular while allowing a selected tubular to roll from said cartridge, wherein said tubular indexing system being moveably attached with said tubular receiving member to move between a loading position and an unloading position.

9. The tubular handling system of claim 1, further comprising:

a cartridge having a first tier support member for supporting a first tier of tubulars;

said cartridge having a first tier opening to allow tubulars to roll from said cartridge first tier supporting member; and a first tubular retaining member positioned with said first tier opening and moveable between a blocking position to block tubulars from moving through said first tier opening, and an unblocked position to allow tubulars to move through said first tier opening.

10. The tubular handling system of claim 9, wherein said first tubular retaining member is a remotely operable retractable pin.

11. The tubular handling system of claim 9, further comprising:

said cartridge having a second tier support member for supporting a second tier of tubulars;

said cartridge having a second tier opening to allow tubulars to roll from said cartridge second tier support member; and a second tubular retaining member positioned with said second tier opening and moveable between a blocking position to block tubulars from moving through said second tier opening, and an unblocked position to allow tubulars to move through said second tier opening, wherein said second tubular retaining member being a remotely operable retractable pin.

12. A tubular handling system, comprising:

a tubular receiving member;

a carriage support member, said carriage support member disposed relative to said tubular receiving member;

a carriage comprising:

a carriage first member moveable relative to said carriage support member, a carriage second member movable relative to said carriage first member, and a carriage third member movable relative to said carriage second member, wherein said carriage is moveable between a first tubular tier position and a second tubular tier position, wherein in said second tubular tier position said carriage positioned farther away from said tubular receiving member than in said first tubular tier position wherein in said second tubular tier position said carriage second member positioned closer to said carriage first member than in said first tubular tier position, and wherein said carriage third member moveable between a neutral position and said first tubular tier position to move a tubular to said tubular receiving member;

a carriage first member hydraulic cylinder coupled to said carriage for moving said carriage between said first tubular tier position and said second tubular tier position; and a replaceable cartridge movably disposed with said carriage third member.

13. The tubular handling system of claim 12, wherein said cartridge having a first tier of tubulars and a second tier of tubulars.

14. The tubular handling system of claim 12, wherein said tubular receiving member having a trolley.

15. The tubular handling system of claim 12, wherein said carriage having a plurality of wheels, said plurality of carriage wheels rolling on said carriage support member.

16. The tubular handling system of claim 12, wherein said tubular receiving member comprising:

a tubular indexing system comprising a first indexing member and a second indexing member, wherein said first indexing member and said second indexing member being independently moveable for blocking the rolling of a tubular while allowing a selected tubular to roll from said cartridge.

17. A tubular handling system, comprising:

a tubular receiving member;

a carriage support member, said carriage support member supporting said tubular receiving member;

a carriage comprising:

a carriage first member moveable relative to said carriage support member, a carriage second member movable relative to said carriage first member, and a carriage third member movable relative to said carriage second member, wherein said carriage is moveable between a first tubular tier position where said carriage third member moves from a neutral position to an inclined position to move a tubular to said tubular receiving member and a second tubular tier position, wherein in said second tubular tier position said carriage is positioned farther away from said tubular receiving member than in said first tubular tier position; wherein in said second tubular tier position said carriage second member is positioned closer to said carriage first member than in said first tubular tier position; and a carriage first member hydraulic cylinder coupled to said carriage for moving said carriage between said first tubular tier position and said second tubular tier position.

18. The tubular handling system of claim 17, wherein said tubular receiving member comprising:

a tubular indexing system comprising a first indexing member and a second indexing member, wherein said tubular indexing system being moveably attached with said tubular receiving member to move between a loading position and an unloading position.

19. A tubular handling system, comprising:

a tubular receiving member;

a carriage support member, said carriage support member supporting said tubular receiving member;

a carriage comprising:

a carriage first member moveable relative to said carriage support member, a carriage second member movable relative to said carriage first member and said carriage support member, and a carriage third member movable relative to said carriage second member and said carriage support member, wherein said carriage is moveable between a first tubular tier position and a second tubular tier position, wherein in said second tubular tier position said carriage is positioned farther away from said tubular receiving member than in said first tubular tier position, and wherein in said second tubular tier position said carriage second member is positioned closer to said carriage first member than in said first tubular tier position;

a carriage first member hydraulic cylinder for moving said carriage between said first tubular tier position and said second tubular tier position;

a carriage second member hydraulic cylinder for moving said carriage second member between said first tubular tier position and said second tubular tier position; and a carriage third member hydraulic cylinder for moving said carriage third member between a neutral position and an inclined position, wherein said carriage third member is moveable between said neutral position and said inclined position to move a tubular to said tubular receiving member.

* * * * *